United States Patent
Carver et al.

(10) Patent No.: US 12,346,174 B2
(45) Date of Patent: Jul. 1, 2025

(54) SYSTEM AND METHOD FOR MANAGEMENT OF DATA PROCESSING SYSTEM COMPONENTS

(71) Applicant: Dell Products L.P., Round Rock, TX (US)

(72) Inventors: Walter R. Carver, Round Rock, TX (US); John R. Stuewe, Round Rock, TX (US); Michael Albert Perks, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 18/048,660

(22) Filed: Oct. 21, 2022

(65) Prior Publication Data

US 2024/0134424 A1  Apr. 25, 2024
US 2024/0231444 A9  Jul. 11, 2024

(51) Int. Cl.
*G06F 1/18* (2006.01)

(52) U.S. Cl.
CPC .............. *G06F 1/186* (2013.01); *G06F 1/189* (2013.01)

(58) Field of Classification Search
CPC ....................................................... H05K 5/00
See application file for complete search history.

(56) References Cited

U.S. PATENT DOCUMENTS

| | | | |
|---|---|---|---|
| 5,602,721 A * | 2/1997 | Slade | G06F 1/18 206/509 |
| 5,761,033 A * | 6/1998 | Wilhelm | H05K 7/1429 361/679.33 |
| 7,698,095 B2 | 4/2010 | Chung et al. | |
| 7,701,713 B2 | 4/2010 | Li | |
| 7,894,208 B1 * | 2/2011 | Lin | G06F 1/187 361/730 |
| 8,182,319 B2 | 5/2012 | Ong et al. | |
| 8,550,702 B2 | 10/2013 | Campbell et al. | |
| 9,129,958 B2 | 9/2015 | Mallik et al. | |
| 9,237,671 B2 | 1/2016 | Chen et al. | |
| 9,706,678 B1 * | 7/2017 | Chen | H05K 7/1491 |
| 9,820,411 B2 | 11/2017 | Alshinnawi et al. | |
| 10,123,452 B2 | 11/2018 | Chen et al. | |
| 10,177,107 B2 | 1/2019 | Camarota | |
| 10,274,945 B2 | 4/2019 | Arensmeier et al. | |
| 10,709,032 B1 | 7/2020 | Holyoake et al. | |
| 11,019,748 B2 | 5/2021 | Avvaru et al. | |
| 11,064,808 B2 | 7/2021 | Chen et al. | |
| 11,129,293 B2 | 9/2021 | Wurmfeld | |
| 11,262,809 B2 | 3/2022 | Pham et al. | |
| 11,293,659 B2 | 4/2022 | Brahme et al. | |
| 11,320,164 B2 | 5/2022 | Roth | |

(Continued)

*Primary Examiner* — Jerry Wu

(74) *Attorney, Agent, or Firm* — WOMBLE BOND DICKINSON (US) LLP

(57) ABSTRACT

Methods, systems, and devices for providing computer implemented services are provided. The computer implemented services may be provided using hardware components of a data processing system. The hardware components may be positioned in a chassis that provide for access to the hardware components for replacement, expansion, and/or other purposes. To do so, the chassis may include sleds in which the hardware components are positioned. The sleds may facilitate operable connections between the hardware components using a limited number of mechanical features.

20 Claims, 19 Drawing Sheets

(56) References Cited

U.S. PATENT DOCUMENTS

| | | | |
|---|---|---|---|
| 2001/0040203 A1 | 11/2001 | Brock et al. | |
| 2013/0141863 A1* | 6/2013 | Ross | G11B 33/128 |
| | | | 361/679.33 |
| 2014/0334084 A1* | 11/2014 | Fricker | H05K 5/0021 |
| | | | 361/679.02 |
| 2018/0011522 A1* | 1/2018 | Shirakami | G06F 1/206 |

* cited by examiner

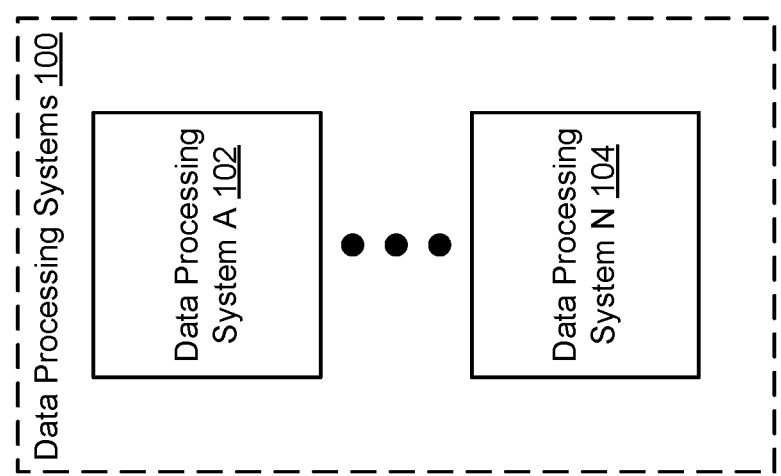

SYSTEM AND METHOD FOR MANAGEMENT OF DATA PROCESSING SYSTEM COMPONENTS

FIELD OF THE EMBODIMENTS

Embodiments disclosed herein relate generally to device management. More particularly, embodiments disclosed herein relate to chassis for devices.

BACKGROUND

Computing devices may store data and used stored data. For example, computing devices may utilize data when providing computer implemented services. If computing devices are unable to access data, process data, and/or perform other functions, then the computing devices may be unable to provide some, or all, of the computer implemented services desired by users of the computing devices.

BRIEF DESCRIPTION OF THE DRAWINGS

Embodiments are illustrated by way of example and not limitation in the figures of the accompanying drawings in which like references indicate similar elements.

FIG. 1 shows a diagram illustrating a system in accordance with an embodiment.

DETAILED DESCRIPTION

Figure 2A:
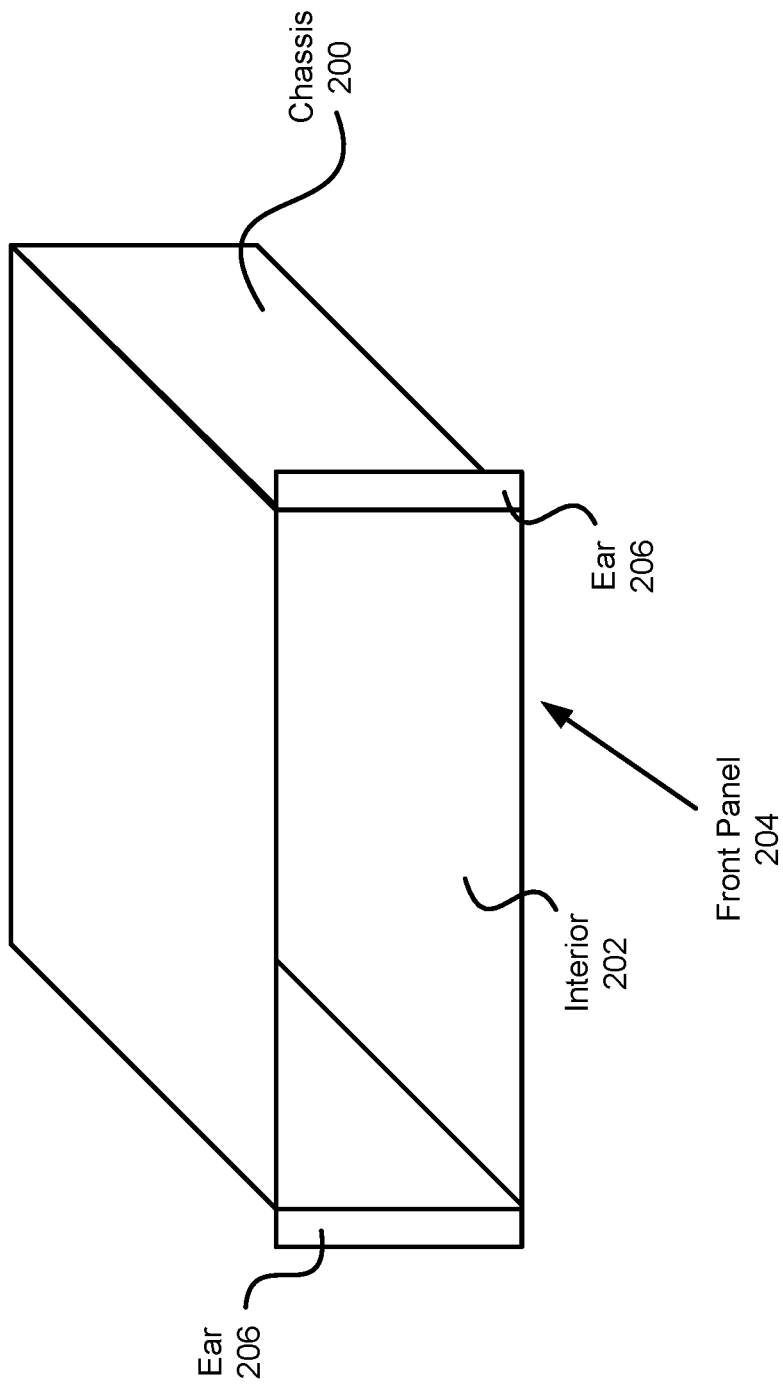
FIG. 2A shows a first diagram of a chassis in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References in the specification to "adapted to" may, in the context of a programmable device, indicate that the programmable device has been programmed to perform the functionality described with respect to the programmable devices. In the context of a static device, "adapted to" may indicate that the device include circuitry to perform the functionality described with respect to the static devices. In the context of mechanical device, "adapted to" may mean that the mechanical device is designed to perform a particular function and may include a shape, size, structure, components thereof, etc. to accomplish the function.

In general, embodiments disclosed herein relate to methods, systems, and devices for providing computer implemented services. The computer implemented services may include any quantity and type of such services, and may be provided by a data processing system.

The data processing system may include hardware components that provide the computer implemented services. Over time the hardware components may be replaced and/or additional hardware components may be added to the data processing system. To do so, various portions of the hardware components may need to be accessed.

To provide access to the hardware components, the hardware components may be positioned in a sled assembly, which may be positioned in a chassis. The chassis may provide support services to the sleds, and the sleds may house the hardware components.

To provide the computer implemented services, the hardware components may need to be operably connected to each other. To facilitate operable connection, sleds of the sled assembly may be stacked on top of each other and interlocked to form the assembly. The sleds may include openings through which internal cabling may be routed to establish operable connections between the hardware components in each of the sleds. Other than the internal cabling, the sleds may be independent from one another. Consequently, to access the hardware components in the sleds, only the internal cabling may need to be disconnected.

By doing so, a data processing system in accordance with embodiments disclosed herein may facilitate time efficient changes in its hardware components. Thus, embodiments disclosed herein may address the technical problem of device failure and/or limitations in computing resource capacity. The disclosed embodiments may address these problems by providing a data processing system to which hardware components may be added and/or replace to replace failed components and/or meet computing loads otherwise not met by available hardware components.

In an embodiment, a data processing system that provides computer implemented services is provided. The data processing system may include a chassis; a sled assembly adapted to be positioned in the chassis, the sled assembly comprising: a first sled comprising: a first enclosure, a compute complex positioned in the first enclosure, and a mating edge positioned on a top side of the first enclosure; and a second sled comprising: a second enclosure, an expansion system positioned in the second enclosure, a mating wing positioned on a bottom side of the second enclosure, the mating wing being adapted to mate with the mating edge to reversibly secure the second sled to the first sled, and a hole in the bottom side of the second enclosure, the hole positioned to facilitate operable connection of the compute complex and the expansion system using cabling while the mating edge and the mating wing are mated.

The second sled may also include a storage component positioned in the second enclosure, the storage component being operably connected to the expansion system, and, while the expansion system is operably connected to the compute complex via the cabling, the storage component is operably connected to the compute complex.

The data processing system may also include a power distribution system adapted to deliver power to the first sled and the second sled.

The expansion system may include a first port to receive the power from the power distribution system; and a second portion to distribute a portion of the power to the storage component.

The compute complex may include a third port to receive the power from the power distribution system.

Positioning the sled assembly in the chassis may include, while the second sled is positioned above the first sled and a front of the first sled is offset from a front of the second sled, an approach of the second sled downward toward the first sled until the mating wing is aligned with the mating edge; and while the mating wing is aligned with the mating edge, a translation of the second sled along a top of the first sled until offset is reduced below a threshold to secure the first sled to the second sled.

Positioning the sled assembly in the chassis may also include, while the first sled is secured to the second sled, an alignment of a power receptacle of the first sled and a power receptacle of the second sled with a manifold of the power distribution system to obtain an aligned sled assembly; and an approach of the aligned sled assembly toward the manifold until the power receptacle of the first sled and the power receptacle of the second sled are mated with the manifold, the manifold providing the power.

Positioning the sled assembly in the chassis may also include, while the first sled is secured to the second sled and prior to the alignment of the power receptacle of the first sled and the power receptacle of the second sled with the manifold, an attachment of the compute complex and the expansion system with the cabling.

The first sled may also include a first cooling system and the second sled further comprises a second cooling system.

The first cooling system may be operably connected to the compute complex and the second cooling system is operably connected to the expansion system.

Operation of the second cooling system may be managed by the compute complex.

The first sled may include a heating system adapted to warm a portion of the compute complex.

The chassis may be a rack mount chassis and the chassis comprises an interior having a height of two rack units.

The first enclosure and the second enclosure may have a combined height when stacked on top of one another of two rack units.

The interior may have a width to accommodate positioning of the first enclosure and the second enclosure in a side by side positioning in the interior.

In an embodiment, a sled assembly is provided, as described above.

Turning to FIG. 1A, a block diagram illustrating a system in accordance with an embodiment is shown. The system shown in FIG. 1A may provide any quantity and type of computer implemented services. To provide the computer implemented services, the system of FIG. 1A may include data processing systems 100.

All, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Data processing systems 100 may provide other types of computer implemented services without departing from embodiments disclosed herein. Data processing systems 100 may each provide similar and/or different computer implemented services, and any of data processing systems 100 may provide any of the computer implemented services in cooperation with other data processing systems and/or independently.

To provide computer implemented services, data processing systems 100 may include any number of hardware components (e.g., processors, memory modules, storage devices, etc.). The hardware components may contribute computing resources used to provide the computer implemented services.

The hardware components may need to operate in predetermined manners to contribute to the computer implemented services provided by data processing systems 100. If not operating in the predetermined manners, the hardware components may not contribute and/or may impede the computer implemented services. In scenarios in which the hardware components are unable to be returned to the predetermined manners of operation, then the hardware components may need to be replaced.

Additionally, the rate at which the computer implemented services are provided and/or the quantity of such services that may be provided (e.g., per unit time) may be limited based on the quantity of computer resources available to provide the computer implemented services. For example, if a load (e.g., demand for the computer implemented services) imposed on data processing systems 100 increases, the load may surpass the computer resources provided by the hardware components. In such scenarios, additional hardware components may be added to data processing systems 100 to increase the rate at which computing resources (e.g., processor cycles, storage cycles, etc.) are made available to provide the computing implemented services, and/or existing hardware components may be replaced with higher performance hardware components to increase the rate at which computing resources are made available to provide the computing implemented services.

In general, embodiments disclosed herein relate to systems, devices, and methods for improving the likelihood that data processing systems 100 are able to provide their computer implemented services. To improve the likelihood that data processing systems 100 are able to provide their computer implemented services, data processing systems 100 may facilitate replacement of and/or addition of hardware components. By doing so, data processing systems 100 may be more likely to have access to sufficient computing resources to provide the computer implemented services (e.g., at rates requested by clients of data processing systems 100).

Generally, adding and/or replacing hardware components may require physical access to various portions of a data processing system. For example, to add a component, a connector or other feature of the data processing system may need to be accessed.

To facilitate replacement of and/or addition of hardware components, data processing systems 100 may be implemented using a flexible hardware architecture. The hardware architecture may include modularized computing units and shared support services (e.g., power/structure) for the modularized computing units provided by chassis. The modularized computing units and shared support services provided by the chassis may facilitate time efficient access to various portions of a data processing system implemented using the flexible hardware architecture.

The modularized computing units may be implemented using different types of sleds (e.g., may include different structures and may house different types of hardware components) that may be (i) used in isolation (e.g., as independent compute instances) and/or (ii) integrated with other sleds to obtain sled assemblies (e.g., a combined compute instance that uses hardware resources from multiple sleds). The modularized computing units may include different types of enclosures that may interlock and facilitate formation of operable connections between hardware components positioned in the interlocked enclosures to establish sled assemblies.

The sled assemblies may be compatible with a chassis design that provides the shared support services. The sled assemblies (and/or individual sleds) may be quickly integrated into and/or removed from a chassis through use of standardized connections supported by the chassis and the sleds (e.g., regardless of type of the sled).

To facilitate replacement of and/or addition of hardware components, the sled assemblies may include very limited numbers of electrical/mechanical connections between interlocked sleds. By doing so, interlocked sleds may be quickly disentangled to facilitate physical access to the hardware components and/or positions in which hardware components may be positioned in the sleds. Through efficient physical access, new hardware components may be added and/or existing hardware components may be replaced to modify the computing resources of the sled assemblies.

For additional details regarding chassis, sleds, and sled assemblies, refer to FIGS. 2A-2M.

The system of FIG. 1A may include any number and types of data processing systems 100. Any of the aforementioned devices may operate independently and/or cooperatively to provide computer implemented services. Data processing systems 100 may provide such services to, for example, user of the data processing systems 100, to other data processing systems 100, and/or to other devices not shown in FIG. 1.

Data processing systems 100 may be operably connected to any of each other and/or other devices via a communication system (not shown). The communication system may include one or more networks that facilitate communication between data processing systems 100 (or portions thereof) and/or other devices. The networks may include, for example, wired networks, wireless network, public networks, private network, the Internet, etc.

While illustrated in FIG. 1 as including a limited number of specific components, a system in accordance with an embodiment may include fewer, additional, and/or different components than those illustrated therein.

As discussed above, data processing systems 100 may be implemented using a chassis. Turning to FIG. 2A, a diagram of chassis 200 in accordance with an embodiment is shown.

Chassis 200 may include a structure for housing sleds, power supplies, and/or other components of a data processing system. Chassis 200 may use the power supplies and/or other components to provide support services to the sled positioned in interior 202 of chassis.

The structure of chassis 200 may be implemented with sheet metal and/or other materials. The sheet metal and/or other materials may be shaped in a hollow, rectangular shape having interior 202.

The structure of chassis 200 may enclose sleds and/or other types of hardware components. For example, interior 202 of chassis 200 may include room to house a certain number of sleds, power supplies, etc. The structure of chassis 200 may comply with a specification such as a rack mount enclosure specification.

Figure 2B:
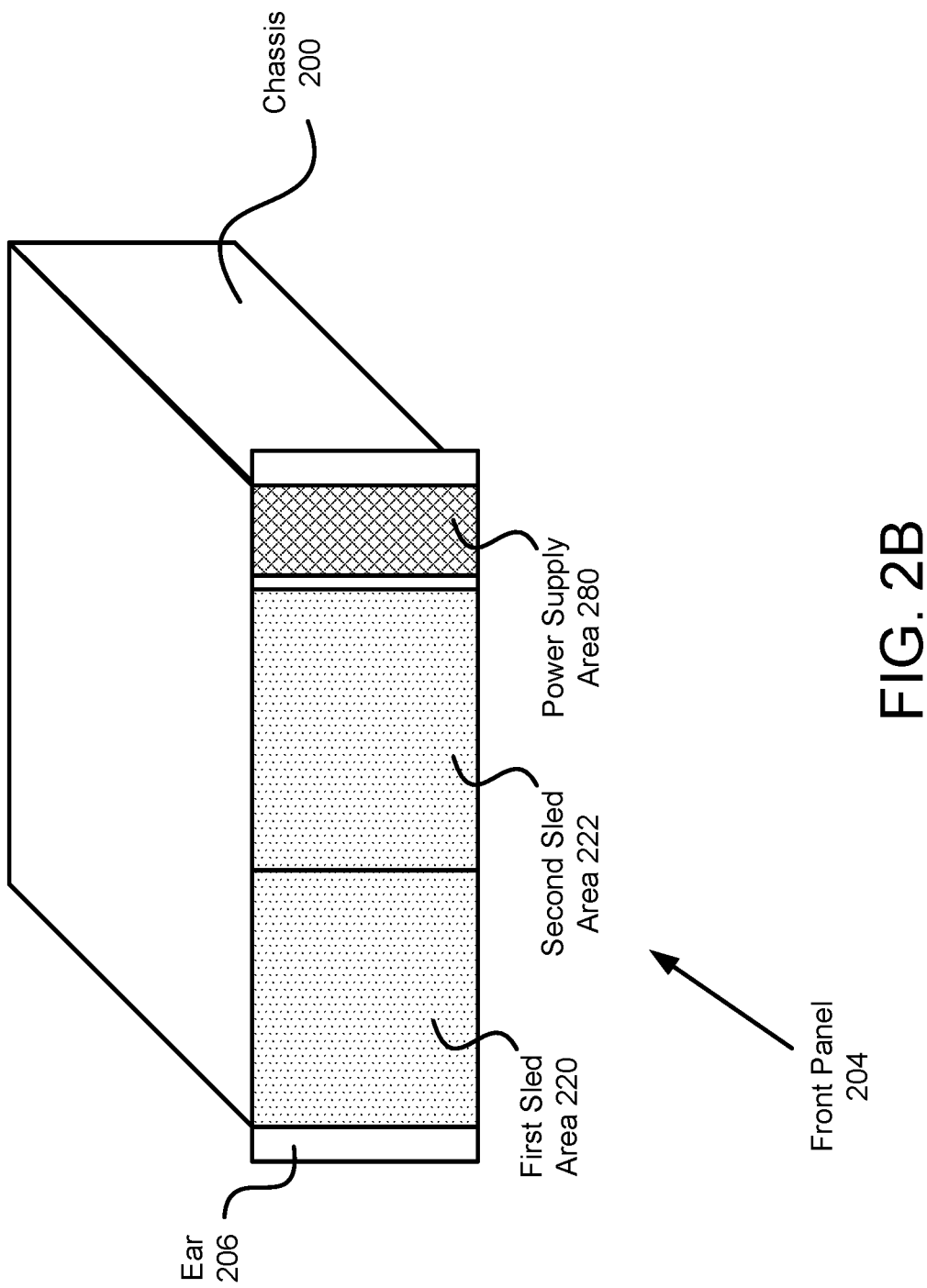
FIG. 2B shows a second diagram of a chassis in accordance with an embodiment.

For example, chassis 200 may be adapted to mount to a rack with a particular bolting pattern on a set of front rails of a rack. The rack may implement a rack unit standardization system where the rack rails include a pattern of mounting features (e.g., holes) that facilitate integration of chassis that have particular heights (e.g., a rack unit 1U, 1.75" or other heights) based on the spacing of the pattern of the mounting features. As will be discussed in greater detail below, the sleds of a data processing system may comply with the specification implemented by chassis 200. For example, each of the sleds may be implemented using 1U enclosures, while interior 202 may be 2U in height thereby accommodating two sleds stacked on top of each other. Likewise, interior may accommodate two sleds positioned next to one another. Refer to FIG. 2B for additional details regarding interior 202.

To retain chassis 200 in the computing environment, chassis 200 may include ears (e.g., 206) extending laterally from front panel 204 of chassis 200. The ears may be positioned to facilitate attachment to the rack rails of a rack. The ears may be implemented with plates, holes in the plates conforming to a bolting pattern of the rack rails, handles, and/or other components to facilitate movement of and securing of chassis 200.

While illustrated in FIG. 2A with a limited number of specific components, a chassis may include additional, fewer, and/or different components without departing from embodiments disclosed herein.

Turning to FIG. 2B, a second diagram of chassis 200 in accordance with an embodiment is shown. In FIG. 2B, areas with infill have been added to illustrate where sleds, power supplies, and/or other components may be positioned in areas of front panel 204 (and/or corresponding volumes of the interior 202 of chassis 200).

As seen in FIG. 2B, the area of front panel 204 may include first sled area 220, second sled area 222, and power supply area 280. Each of the sled areas (e.g., 220, 222) may have dimensions that accommodate insertion of two 1U sleds stacked on top of each other, or a 2U sled. Thus, as seen in FIG. 2B, chassis 200 may accommodate four 1U sleds or 2 2U sleds. As will be discussed below, embodiments disclosed herein may facilitate integration of 2 1U sleds to obtain a 2U sled compatible with chassis 200.

To provide support services for the sleds in the sled areas, power supply area 280 may have dimensions that accommodate insertion of two power supplies to provide a level of redundancy and/or meet current demands by the sleds positioned in chassis 200.

Figure 2C:
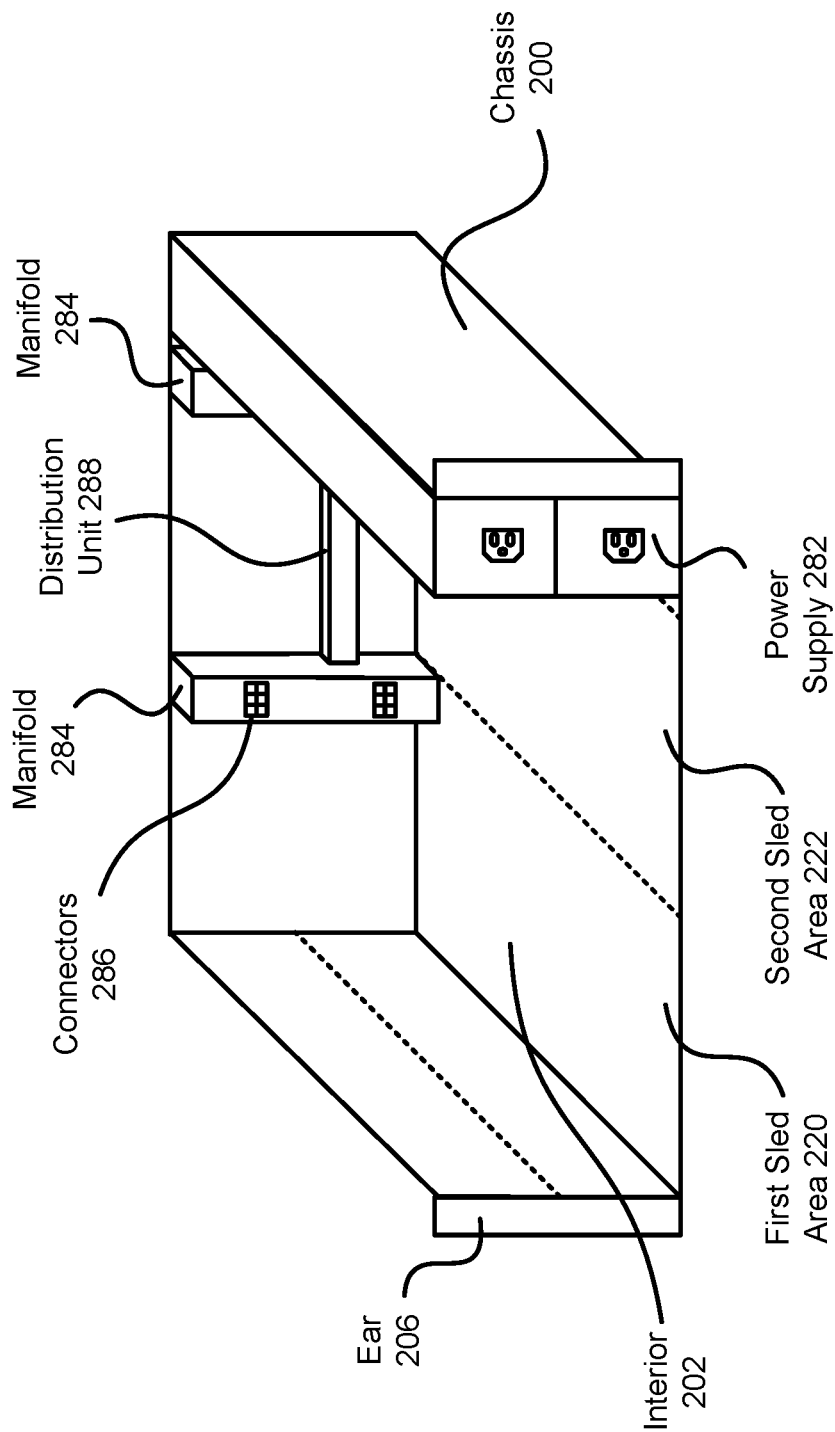
FIG. 2C shows a third diagram of a chassis in accordance with an embodiment.

Turning to FIG. 2C, a third diagram of chassis 200 in accordance with an embodiment is shown. In FIG. 2C, a top cover has been removed to expose interior 202 of chassis 200. Additionally, power supplies (e.g., 282) are positioned in power supply area 280. Lastly, dashed lines have been superimposed on a bottom, interior surface of chassis 200 to illustrate where sleds may be placed in interior 202 of chassis 200.

To provide support services for sleds positioned in interior 202, manifolds (e.g., 284) may be positioned in interior 202. The manifolds 284 may include various connectors (e.g., 286) that may form operable connections with sleds positioned in interior 202. As seen in FIG. 2C, the manifolds may include connectors at different heights from the bottom of interior 202. These heights may correspond to where complementary connectors of sleds may be positioned. The connectors may be adapted to automatically form operable connections with the complementary connectors during insertion of and while the sleds are positioned in interior 202. Thus, the operable connections may be made through alignment of a sled with connectors 286 and translation of the sled toward connectors 286 until connectors 286 is mated with a complementary connector of a sled. In the context of a sled assembly, mating between two connectors and two complementary connectors may occur via a single translation of the sled assembly.

The manifolds and connectors may supply power to the sleds, may place the hardware components within the sleds in operable communication with rack level management devices (e.g., a rack controller that may provide rack level thermal management, power management, etc.), and/or may otherwise provide services to the sleds.

To supply power, the manifolds may be operably connected to the power supplies and/or other components via distribution unit 288. Distribution unit 288 may include power buses (e.g., to distribute power from power supplies to connectors), communication cabling, and/or other features. Distribution unit 288 may connect to multiple manifolds and other devices.

While not illustrated in FIG. 2C, the manifolds and/or other portions of chassis 200 may include guide pins, slots, and/or other structures to align sleds during and after insertion into interior 202. These structures may improve the likelihood of establishing connections between the sleds and connectors of the manifolds. For example, the structures may direct the slides along a predetermined motion path so that the connectors are aligned with complementary structures on the sleds.

As discussed above, chassis 200 may accommodate individual sleds and sled assemblies. FIGS. 2D-2I show diagrams of portions of sled assemblies in accordance with an embodiment.

Figure 2D:
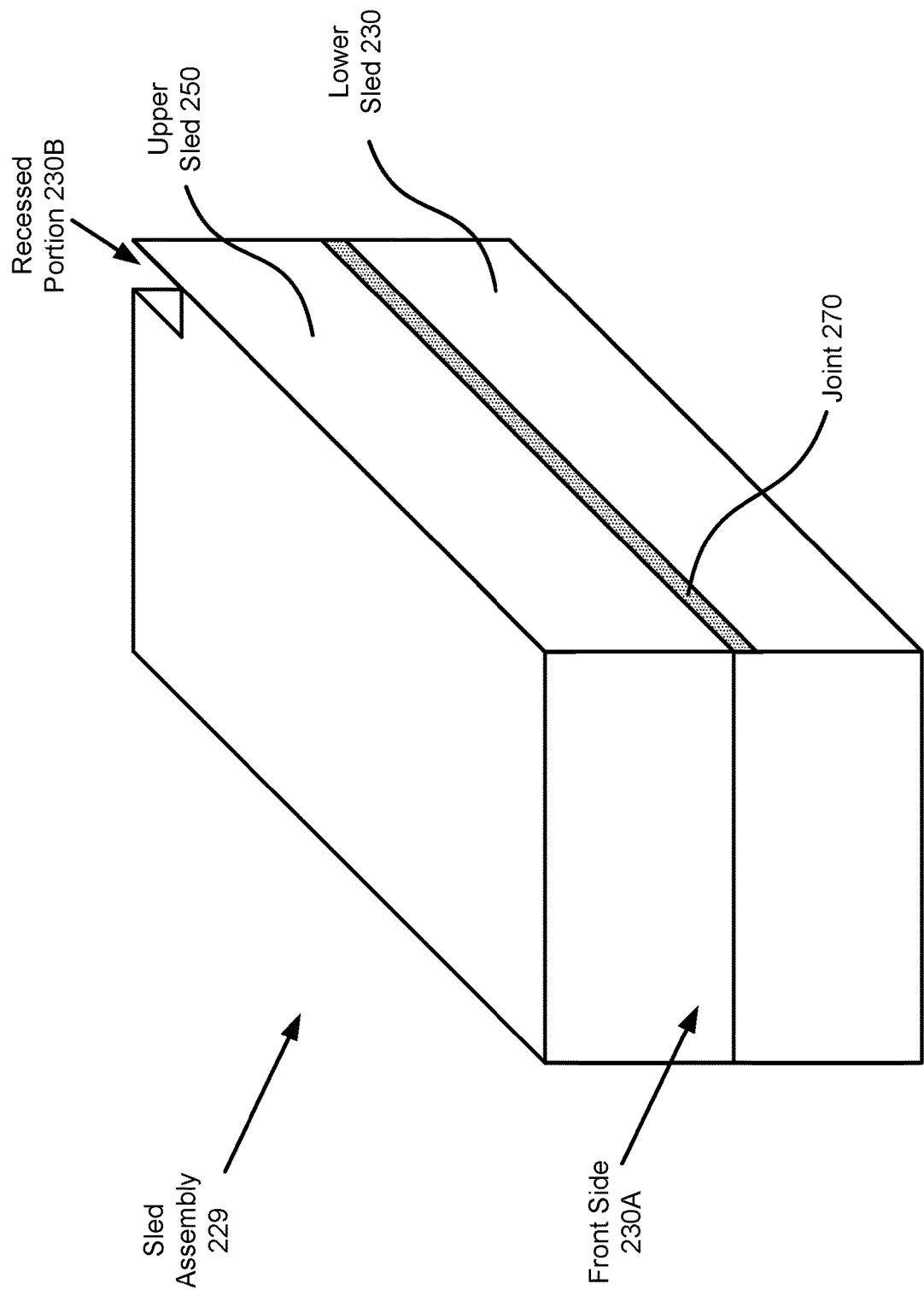
FIG. 2D shows a diagram of a sled assembly in accordance with an embodiment.

Turning to FIG. 2D, a diagram of sled assembly 229 in accordance with an embodiment is shown. In FIG. 2D, sled assembly 229 is shown in an orientation where it may be inserted into chassis 200. Recessed portion 230B on a rear side of sled assembly 229 may accommodate a manifold and may include complementary connectors of the sleds (e.g., 230, 250) of sled assembly 229. While front side 230A (e.g., fronts of sleds 230, 250) of sled assembly 229 is shown without illustrations for various components positioned thereon for conciseness, it will be appreciated that various features such as (i) gas flow vents, (ii) communication ports, (iii) bays (e.g., hot swap bays), and/or (iv) other types of features may be positioned on front side 230A without departing from embodiments disclosed herein.

Sled assembly 229 may include various hardware components of one or more data processing systems, and may facilitate cooperative operation of the hardware components.

Figure 2E:
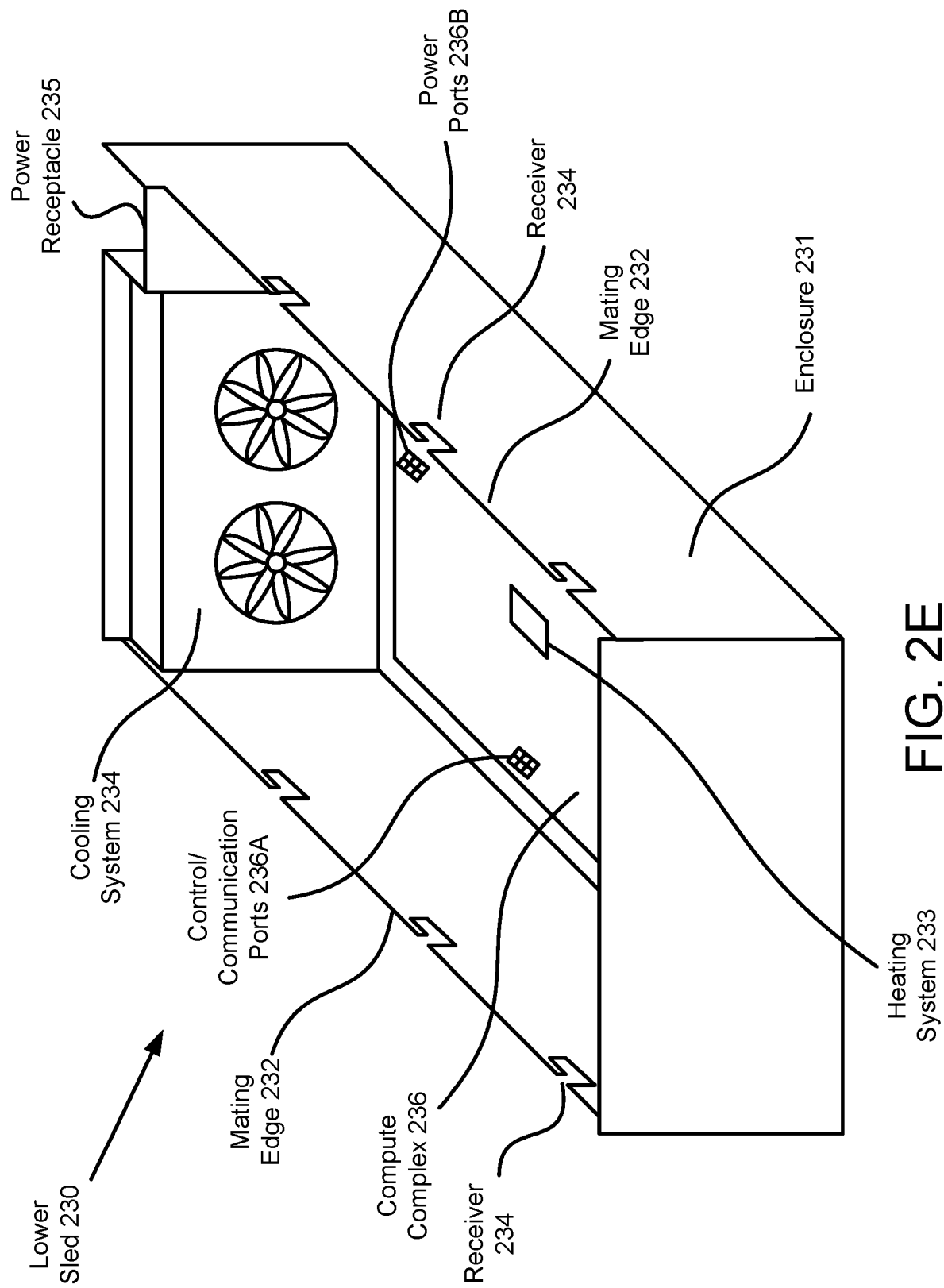
FIG. 2E shows a diagram of a lower sled in accordance with an embodiment.
Figure 2F:
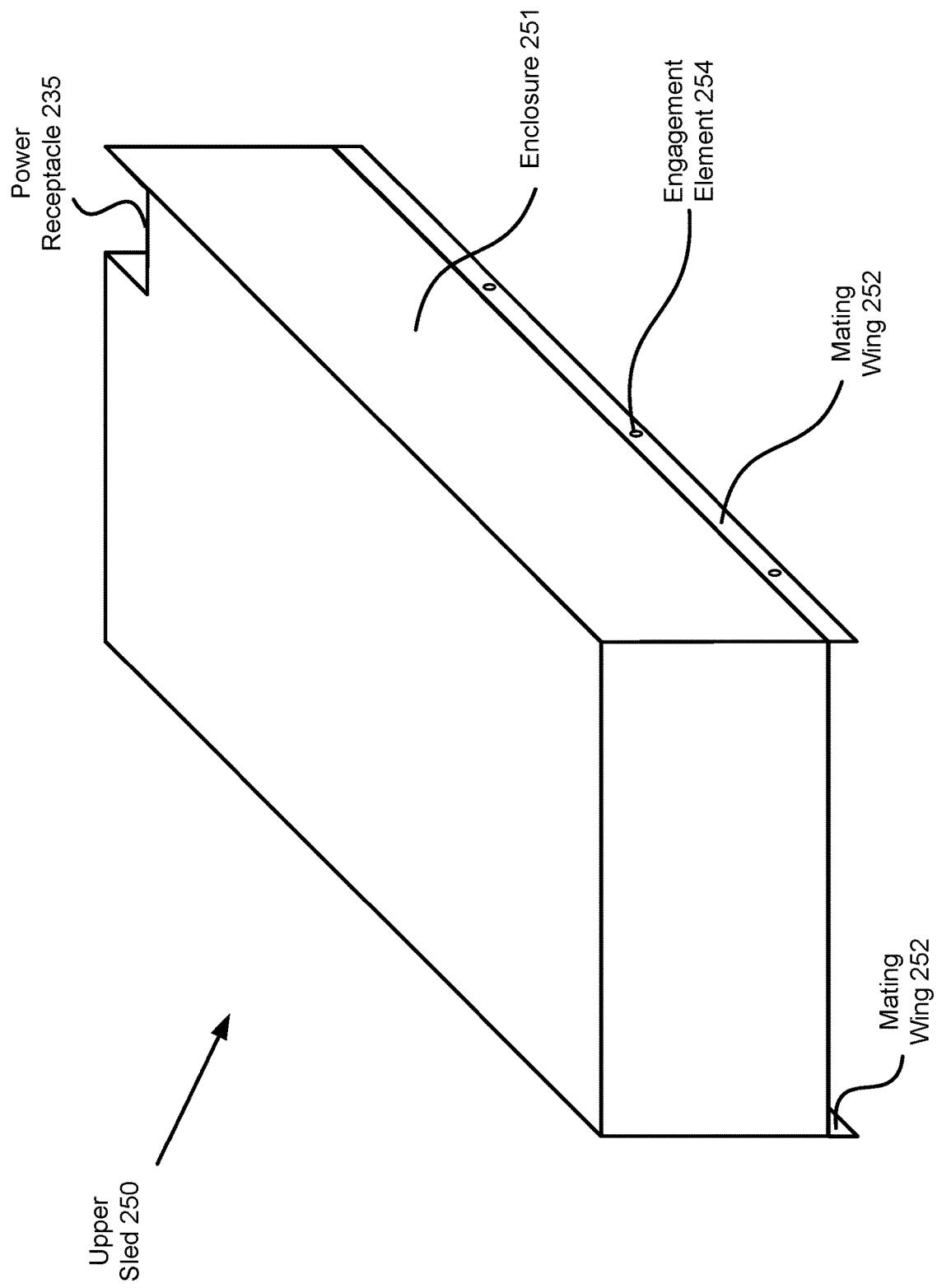
FIGS. 2F-2G show diagrams of an upper sled in accordance with an embodiment.
Figure 2G:
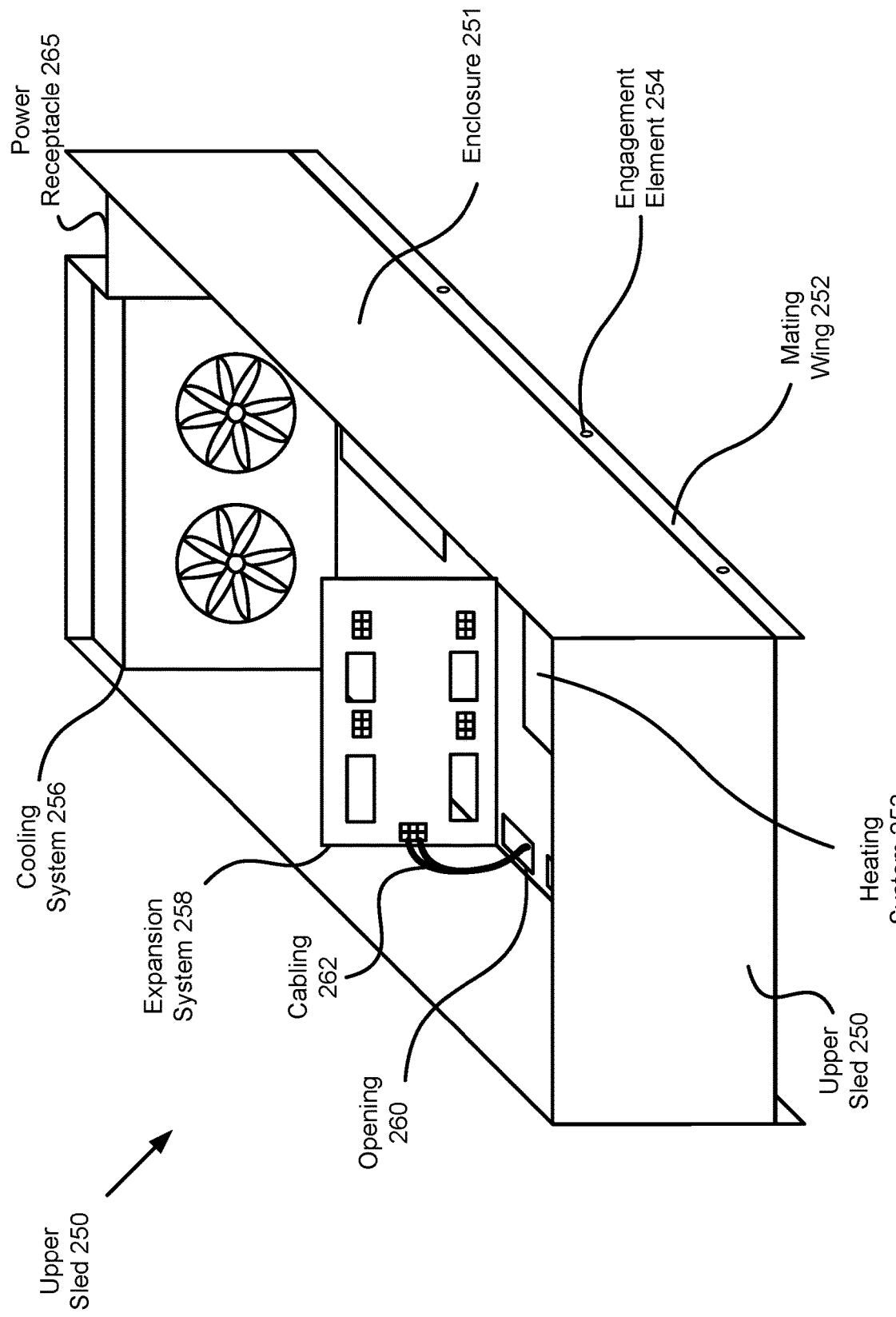

Sled assembly may include upper sled 250 and lower sled 230. Some of the hardware components of the one or more data processing systems may be positioned in each sled. Refer to FIGS. 2E and 2G for additional details regarding the hardware components that may be positioned in each sled.

Returning to the discussion of FIG. 2D, lower sled 230 may be a sled that may operate independently or be combined with another sled to obtain sled assembly 229. In FIG. 2D, lower sled 230 is illustrated in combination with upper sled 250. However, it will be appreciated that upper sled 250 may be replaced by a cover that may transform lower sled 230 into a 1U compliant sled which may be positioned in chassis 200 and operate independently of other sleds. The cover may include, for example, mating wings and engagement elements as discussed below with respect to FIG. 2F.

To form sled assembly 229, lower sled 230 and upper sled 250 may be mechanically coupled to one another via joint 270 (drawn with dotted infill). Joint 270 may facilitate reversible attachment of upper sled 250 to lower sled 230. Joint 270 may include portions of upper sled 250 and lower sled 230 that may interlock with one another through a set of movements with respect to one another, and may disengage from one another through a revere set of the movements.

In an embodiment, upper sled 250 and is merely positioned on lower sled 230 via joint 270, and may not interlock the two sleds. Consequently, upper sled 250 may merely lift off of lower sled 230 without needing to move in other directions along a disengagement path (e.g., at least partially along a surface of lower sled 230).

In an embodiment, joint 270 include various fastening elements to secure the interlocking between upper sled 250 and lower sled 230. Refer to FIGS. 2E and 2F for additional details regarding the portions of the sleds that may interlock.

While illustrated in FIG. 2D with a limited number of specific components, a sled assembly may include additional, fewer, and/or different components without departing from embodiments disclosed herein.

Turning to FIG. 2E, a diagram of lower sled 230 in accordance with an embodiment is shown. Lower sled 230 may be oriented in FIG. 2E similarly to FIG. 2D, with upper sled 250 being removed in FIG. 2E.

Lower sled 230 may include enclosure 231. Enclosure 231 may be a mechanical structure delimiting a volume in which various components may be placed.

To facilitate attachment of lower sled 230 to upper sled 250, enclosure 231 may include mating edge 232. Mating edge 232 may be positioned along a top edge of enclosure 231. For example, mating edge 232 may be positioned on two edges along the sides of enclosure 231.

Mating edge may be a portion of joint 270. To facilitate selective interlocking, mating edge 232 may include any number of receivers (e.g., 234). The receivers may receive and secure portions of upper sled 250. For example, the receivers may be implemented with L-shaped cut out portions that allow a portion (e.g., a pin) of an upper sled to initially traverse downward into the receiver, and then from front to back (or the reverse). Once located therein, the receivers may prevent the upper sled from moving away from the lower sled (e.g., through mechanical interference). While not shown, mating edge may also include various fasteners to also selectively prevent front to back movement thereby preventing relative movement of the sleds with respect to one another while interlocked.

Lower sled 230 may include compute complex 236. Compute complex 236 may include hardware components such as processors and memory modules that facilitate data processing. While lower sled 230 may also include storage devices, when combined with an upper sled the upper sled may significantly contribute storage resources to compute complex 236.

To do so, compute complex 236 may include control/communication ports 236A. These ports may facilitate formation of operable connections between the hardware components of compute complex 236 and hardware components positioned in an upper sled. For example, the ports (e.g., 236A) may facilitate formations of connections using cabling.

To operate, compute complex 236 may receive power from the shared services provided by chassis 200. To receive power, compute complex 236 may include power ports 236B which may facilitate connection to power receptacle 235 (not shown explicitly, may be positioned on a back side that is not visible in the figure, the power receptacle may receive power from a manifold and may be complementary to the connectors on the manifold to establish various connections between the manifold and the sled). For example, power ports 236B may be connected to power receptacle 235 via cabling thereby facilitating flow of electrical power to compute complex 236.

Any of the hardware components of compute complex 236 may have thermal operating limits. If exceeded, operation of the hardware components may be impaired (e.g., may fail to operate, may operate with errors, may become damaged if operated, etc.).

To retain temperature of the hardware components within the thermal operating limits, lower sled 230 may include heating system 233 and cooling system 234. Heating system 233 may selectively generate heat and may be positioned to warm one or more hardware components when the temperature of the hardware components (e.g., processors, management controllers, etc.) are at risk of falling below and/or below the thermal operating limits. Heating system 233 may include, for example, resistive heating elements that may consume electric power and generate heat that may warm any of the hardware components positioned in lower sled 230.

Likewise, cooling system 234 may selective cool hardware components of lower sled 230. To do so, cooling system 234 may include fans and/or other devices that may generate flows of gasses through lower sled 230. The flows of gasses may cool any of the hardware components of lower sled 230.

All of the components of lower sled 230 may be powered using power obtained via power receptacle 235.

While illustrated in FIG. 2E with a limited number of specific components, a lower sled may include additional, fewer, and/or different components without departing from embodiments disclosed herein.

Turning to FIG. 2F, a diagram of upper sled 250 in accordance with an embodiment is shown. Upper sled 250 may be oriented in FIG. 2F similarly to FIG. 2D, with lower sled 230 being removed in FIG. 2F.

Upper sled 250 may include enclosure 251. Enclosure 251 may be a mechanical structure delimiting a volume in which various components may be placed.

To facilitate attachment of upper sled 250 to lower sled 230, enclosure 251 may include mating wings (e.g., 252) corresponding to the mating edges of lower sled 250. The mating wings may be positioned along a bottom edge of enclosure 251. For example, mating wing 252 may be positioned on two edges along the sides of enclosure 231 as shown in FIG. 2F.

Mating wing 252 may be a portion of joint 270. To facilitate selective interlocking with mating edges, mating wing 252 may include any number of engagement elements (e.g., 254). The engagement elements may be inserted into and secure portions of lower sled 230. For example, the engagement elements may be implemented with pins extending from mating wing 252. The positions and shapes of the pins may allow for insertion of the pin into corresponding receivers of the mating edges of lower sled 230. Once located therein, the pins may prevent upper sled 250 from moving away from the lower sled (e.g., through mechanical interference). While not shown, mating wings (e.g., 252) may also include various fasteners to also selectively prevent the pins from disengaging from the receivers.

Lower sled 230 may include compute complex 236. Compute complex 236 may include hardware components such as processors and memory modules that facilitate data processing. While lower sled 230 may also include storage devices, when combined with an upper sled the upper sled may significantly contribute storage resources to compute complex 236.

Turning to FIG. 2G, a second diagram of upper sled 250 in accordance with an embodiment is shown. In FIG. 2G, a cover portion of upper sled 250 has been removed to expose the interior of upper sled 250.

Continuing with the discussion of upper sled 250, in contrast to lower sled 230 which may include a compute complex, upper sled may include expansion system 258. Expansion system may allow for operable connection and cooperative operation of hardware components positioned in upper sled 250 with the compute complex positioned in lower sled 230. These hardware components may be, for example, Peripheral Component Interconnect Express (PCIe), Nonvolatile Memory Express (NVMe), and/or other types of devices that may be operably connected with the compute complex positioned in lower sled 230. Additionally, while described with respect to expansion type devices, a second compute complex may be positioned in upper sled 250 without departing from embodiments disclosed herein. The compute complexes positioned in the sleds may operate independently or cooperatively to provide computer implemented services.

Expansion system 258 may be implemented with a circuit card and one or more ports (e.g., connectors attached to traces of the circuit card). At least one of the ports may be adapted to be connected to control/communication port 236A (e.g., which may support high speed communications and/or command interfaces between compute complex 236 and expansion system 258). When so connected, compute complex 236 may be placed in operable communication with expansion system 258. Through expansion system 258, compute complex 236 may communication and/or control hardware components positioned in upper sled 250.

For example, various types of hardware devices (e.g., hard disk drives, solid state drives, graphics processing units, special purpose compute devices, etc.) may be positioned in upper sled 250 and operably connected to expansion system 258. These hardware components may be used through the communication/power/management fabric provided by expansion system 258.

While described with respect to cabling, other types of devices may facilitate operable connection between the components positioned in each of the sleds without departing from embodiments disclosed herein. For example, risers, circuit cards (e.g., interposers that may extend into each of the sleds, and/or other types of hardware components for interconnecting the hardware components positioned in each of the sleds may be used to implement a sled assembly.

In an embodiment, expansion system 258 include functionality to implement one or more communication schemes including, for example, peripheral component interconnect express, nonvolatile memory express (NVMe), NVME over fiber, (NVMe-oF), etc. For example, expansion system 258 may include communication chipsets that facilitate performance of these communications. The chipset may establish one or more communication links through which compute complex may communicate with hardware components positioned in upper sled 250.

To facilitate operable connection of expansion system 258 and compute complex 236, enclosure 251 may include one or more openings (e.g., 260). The openings may be positioned on a bottom of enclosure 251. Consequently, when upper sled 250 is positioned on lower sled 230, portions of compute complex (e.g., control/communication ports 236A) may be accessible via the openings. Through the access provided by opening 260, cabling 262 may be connected to expansion system 258 and control/communication ports 236A thereby establishing one or more operable connections between expansion system 258 and compute complex 236.

Similar to compute complex 236, expansion system 258 may obtain power from power receptacle 265 of upper sled 250. Consequently, compute complex 236 and expansion system 258 may be independently powered.

Like lower sled 230, upper sled 250 may also include a heating system (e.g., 253) and a cooling system (e.g., 256) that may be used to retain the temperatures of hardware components positioned in upper sled 250 within their thermal operating limitations.

However, unlike compute complex 236, expansion system 258 may not manage the operation of cooling system 256 and heating system 253. Rather, compute complex 236 may manage the operation of these components.

While discussed above as providing for expansion of the capabilities of a lower sled, upper sled 250 may house an independent compute complex and may operate independently from a lower sled 230 without departing from embodiments disclosed herein. For example, each of the sleds of a sled assembly house hardware components that may form data processing systems that may operate cooperatively and/or independently from one another.

Figure 2H:
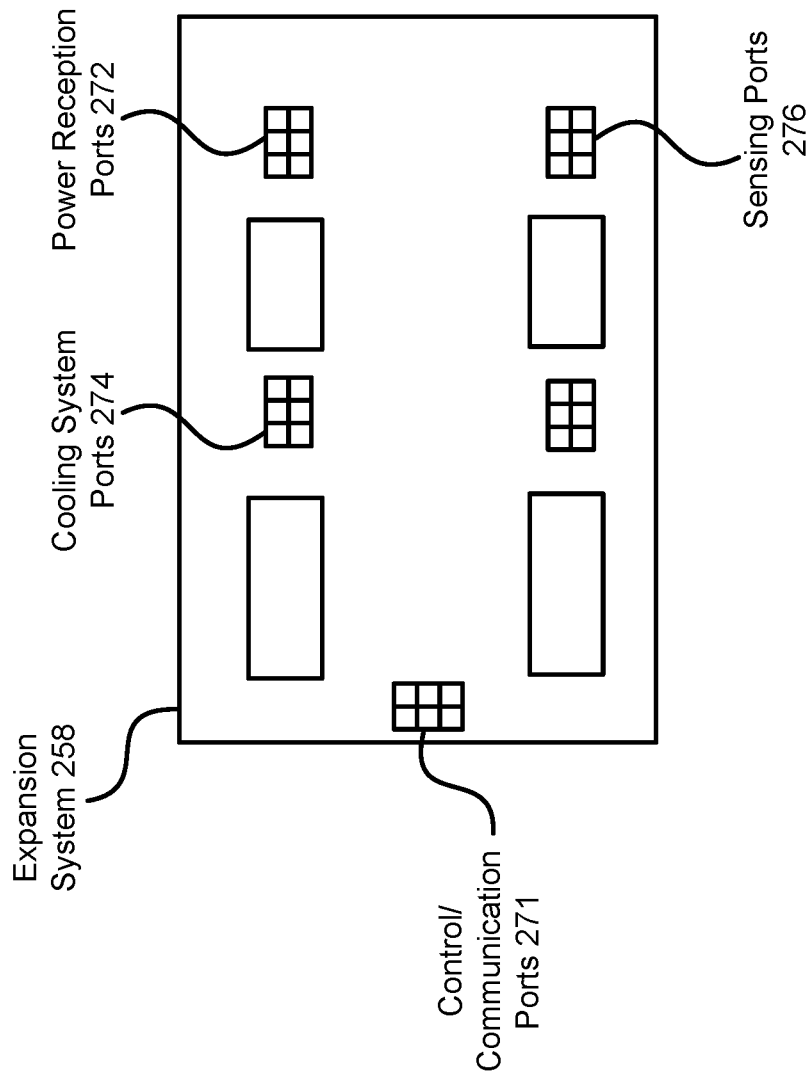
FIG. 2H shows a diagram of an expansion system in accordance with an embodiment.

While illustrated in FIG. 2H with a limited number of specific components, an upper sled may include additional, fewer, and/or different components without departing from embodiments disclosed herein.

Turning to FIG. 2H, a front view diagram of expansion system 258 in accordance with an embodiment is shown. To facilitate communications with various components in upper sled 250, expansion system 258 may include control/communication ports 271, cooling system ports 274, power reception ports 272, sensing ports 276, and/or other types of ports.

Control/communication ports 271 may connect with control/communication ports 236A via cabling to place compute complex 236 in operable communication with expansion system 258.

Cooling system ports 274 may facilitate communication with cooling components in upper sled 250. When connected to a cooling component via cabling, cooling system ports 274 may place the cooling components in operable communication with compute complex 236.

Sensing ports 276 may facilitate communication with sensing components in upper sled 250 such as temperature sensors (e.g., through which compute complex 236 may ascertain when to activate heating/cooling components in upper sled 250. When connected to a temperature sensor via cabling, sensing ports 276 may place the temperature sensor in operable communication with compute complex 236.

Power reception ports 272 may facilitate reception of power from a power supply (e.g., via power receptacle 265). Thus, like lower sled, the components positioned in upper sled 250 may be independently powered via power received via power receptacle 265.

While illustrated in FIG. 2H with a limited number of specific components, an expansion system may include additional, fewer, and/or different components without departing from embodiments disclosed herein.

As discussed above, embodiments disclosed herein may facilitate replacement of components and/or addition of components to a data processing system. FIGS. 1I-1M show diagrams of actions that may be performed to facilitate replacement and/or addition of a hardware component to data processing system implemented using hardware components positioned in sleds positioned in a chassis in accordance with an embodiment.

Figure 2I:
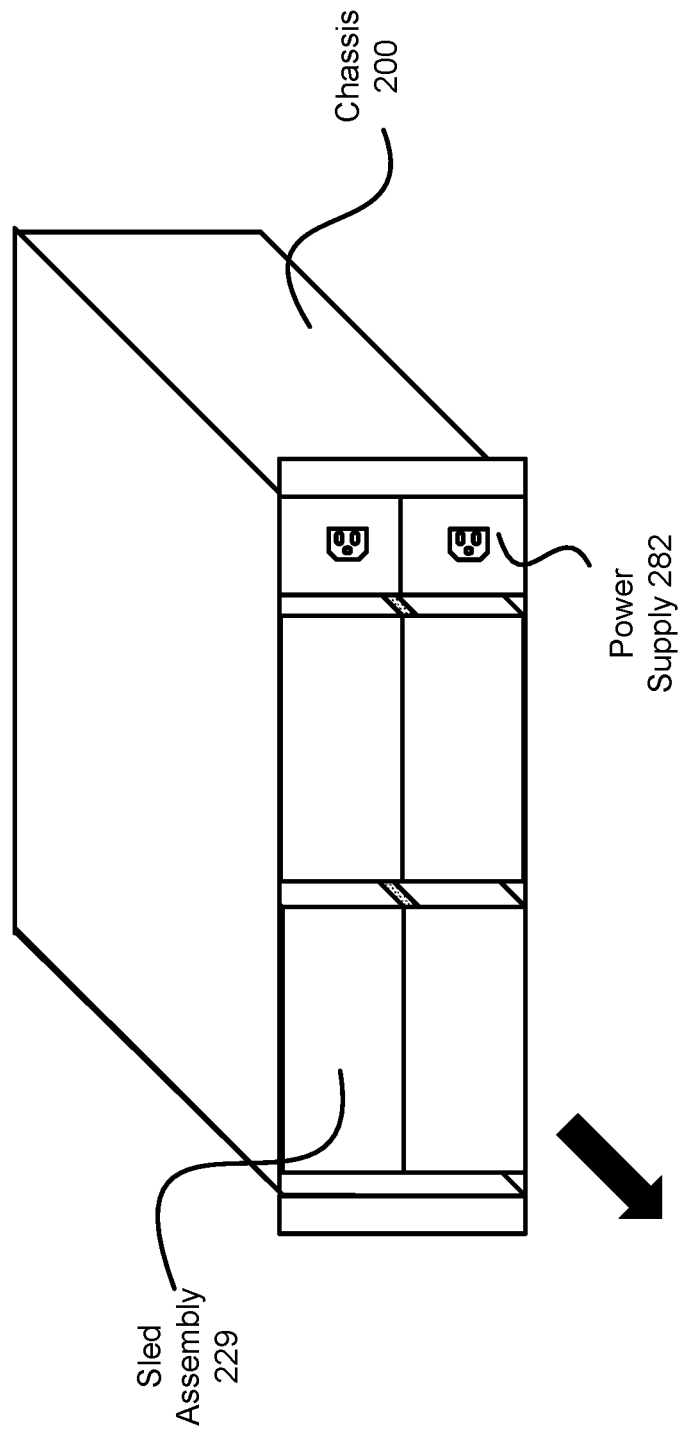
FIGS. 2I-2M show diagrams illustrating a process of accessing a hardware component in accordance with an embodiment.

Turning to FIG. 2I, a first diagram of chassis 200 in accordance with an embodiment is shown. Consider a scenario where hardware components of a data processing system are positioned in sled assembly 229, and a processor of the hardware components fails necessitating replacement of the processor. To perform the replacement, as illustrated by the oversized arrow, sled assembly 229 may initially be pulled out of the front of chassis 200. Doing so may automatically disengage a manifold of chassis 200 from sled assembly.

Figure 2J:
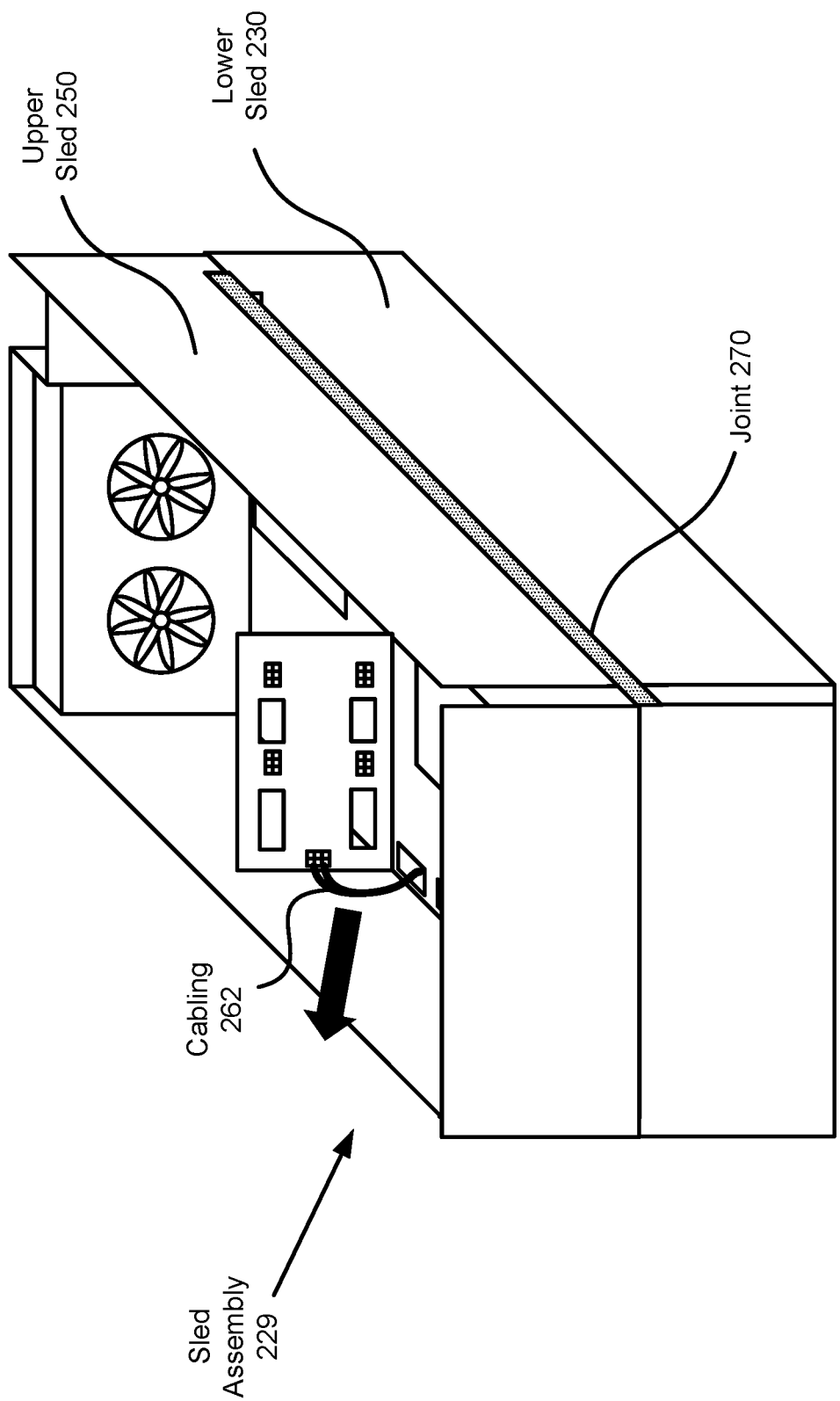

Turning to FIG. 2J, a first diagram of sled assembly 229 in accordance with an embodiment is shown. Continuing with the scenario, once removed from chassis 200 via a motion path away from the manifold and rear of the chassis, a top cover of upper sled 250 may be removed (or may not be in place as shown in FIG. 2J) to expose cabling 262. Cabling 262 may be mechanically linking a compute complex in lower sled 230 to an expansion system in upper sled 250. Consequently, upper sled 250 may not be removed from lower sled 230 without disengaging of cabling 262.

To disengage cabling 262, force may be applied to the connector to the port of expansion system or the compute complex (e.g., via an opening in a bottom of the enclosure of upper sled 250). The force may disconnect the connector from the port.

Figure 2K:
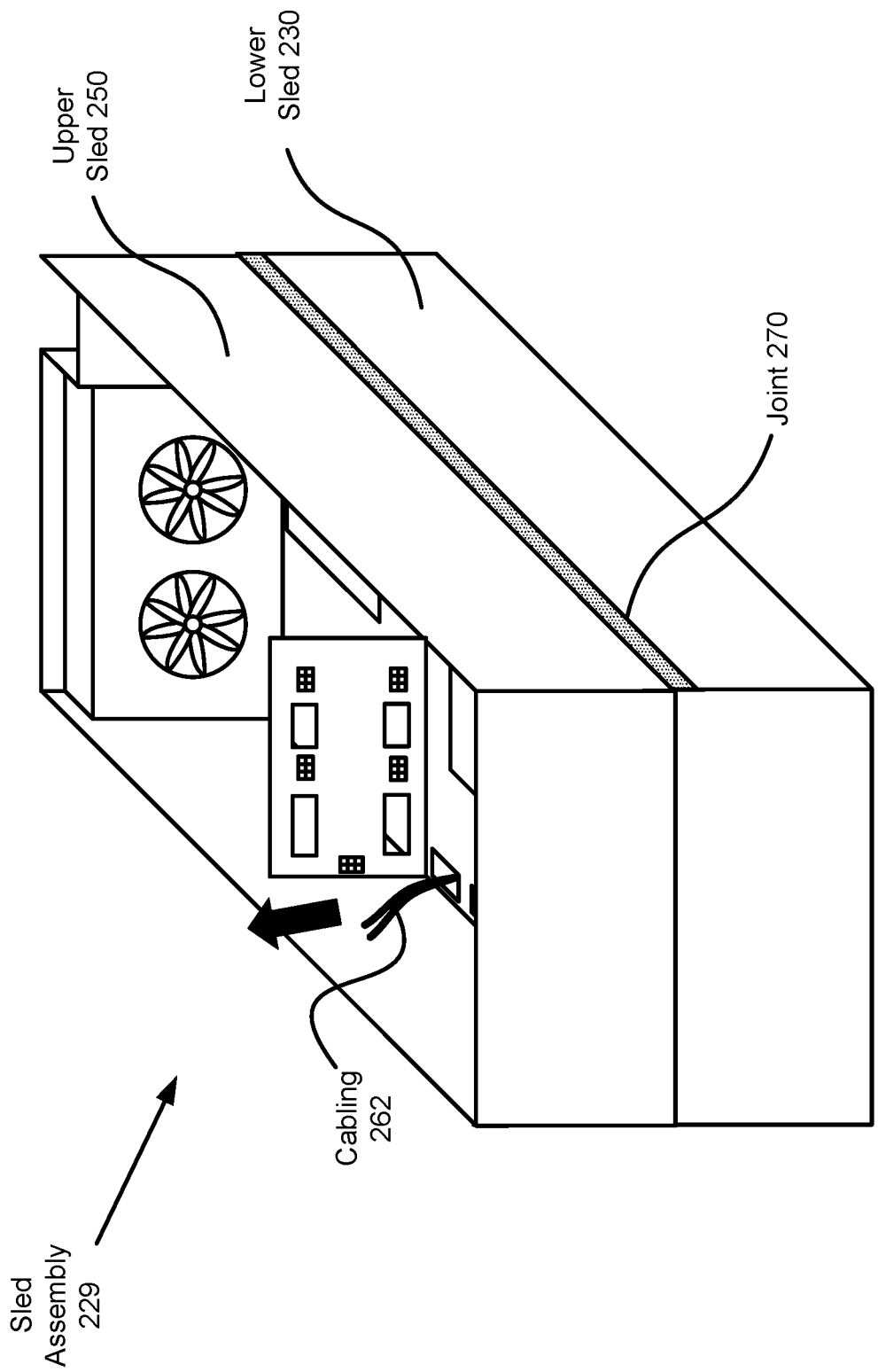

Turning to FIG. 2K, a second diagram of sled assembly 229 in accordance with an embodiment is shown. Continuing with the scenario, disconnected force may be applied to cabling 262 to remove it from upper sled 250 or lower sled 230 (e.g., depending on which end of the cabling has been disengaged, or both ends). In FIG. 2K, the connections to the expansion system and the compute complex have been disconnected. Accordingly, cabling 262 may be entirely removed from both sleds.

Figure 2L:
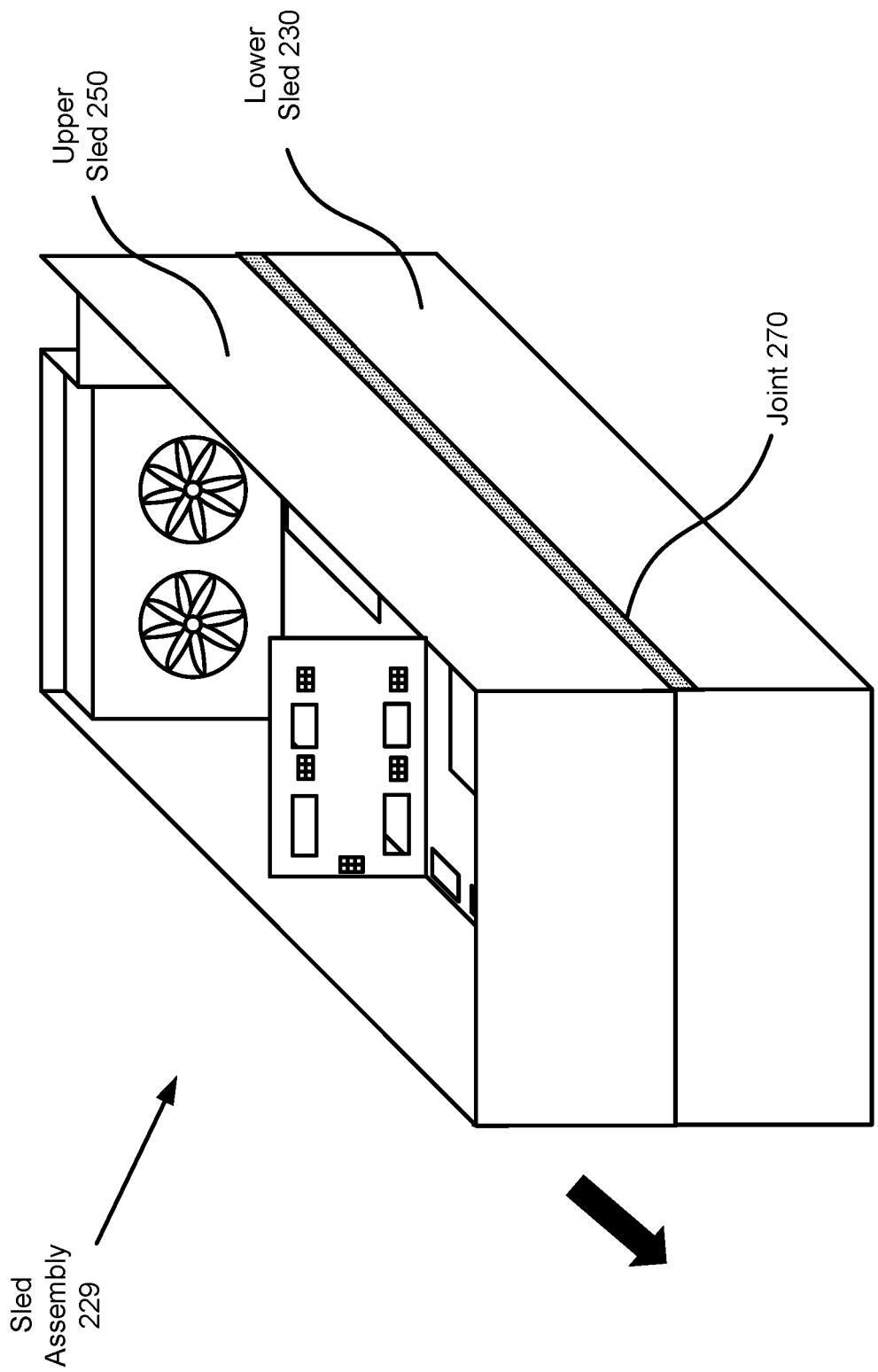

Turning to FIG. 2L, a third diagram of sled assembly 229 in accordance with an embodiment is shown. Continuing with the scenario, once removed, force may be applied to the slides to slide the upper sled with respect to the lower sled (e.g., to offset the fronts of the sleds from one another thereby placing the engagement elements (e.g., 254) of the upper sled 250 in position to move away from the lower sled without mechanical interference.

Figure 2M:
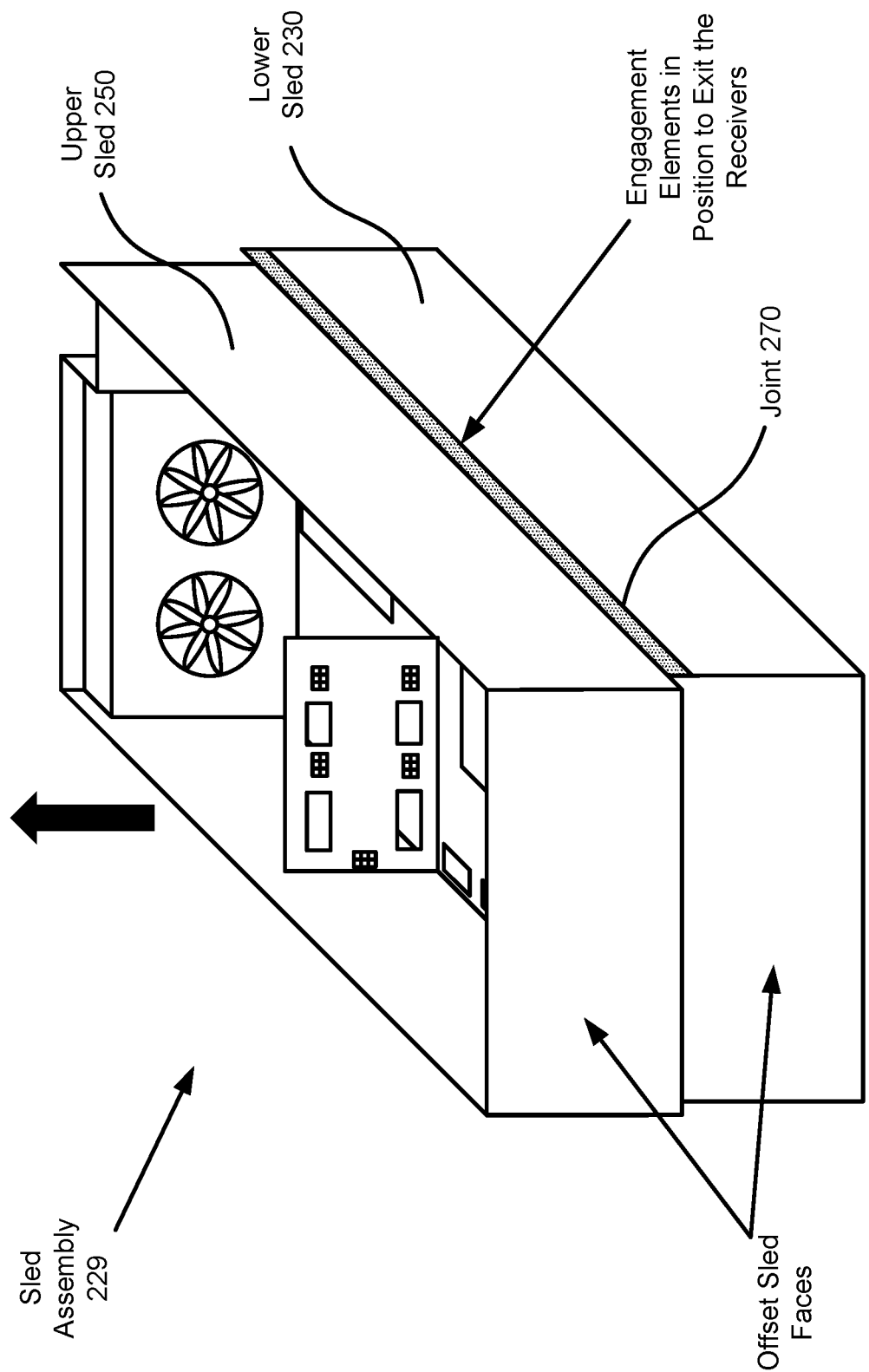

Turning to FIG. 2M, a fourth diagram of sled assembly 230 in accordance with an embodiment is shown. Continuing with the scenario, after upper sled 250 is moved forward thereby offsetting the faces of the sleds, upper sled 250 may be lifted or otherwise moved away from lower sled 230. Doing so may expose the compute complex of lower sled 230 (e.g., as shown in FIG. 2E) thereby facilitating access to the failed processor for replacement. Similar processes may be repeated for other hardware components in lower sled 230, and/or to add new components to lower sled if lower sled is able to accommodate additional components.

Using the method illustrated in FIGS. 2I-2M, the hardware components of a data processing system in a chassis may be efficiently accessed.

Once assembled, the sled assembly may be positioned in the chassis. To facilitate placement of sled assemblies and other types of chassis (e.g., 1U chassis), a chassis may include features for positioning and/or supporting different types of chassis.

Figure 2N:
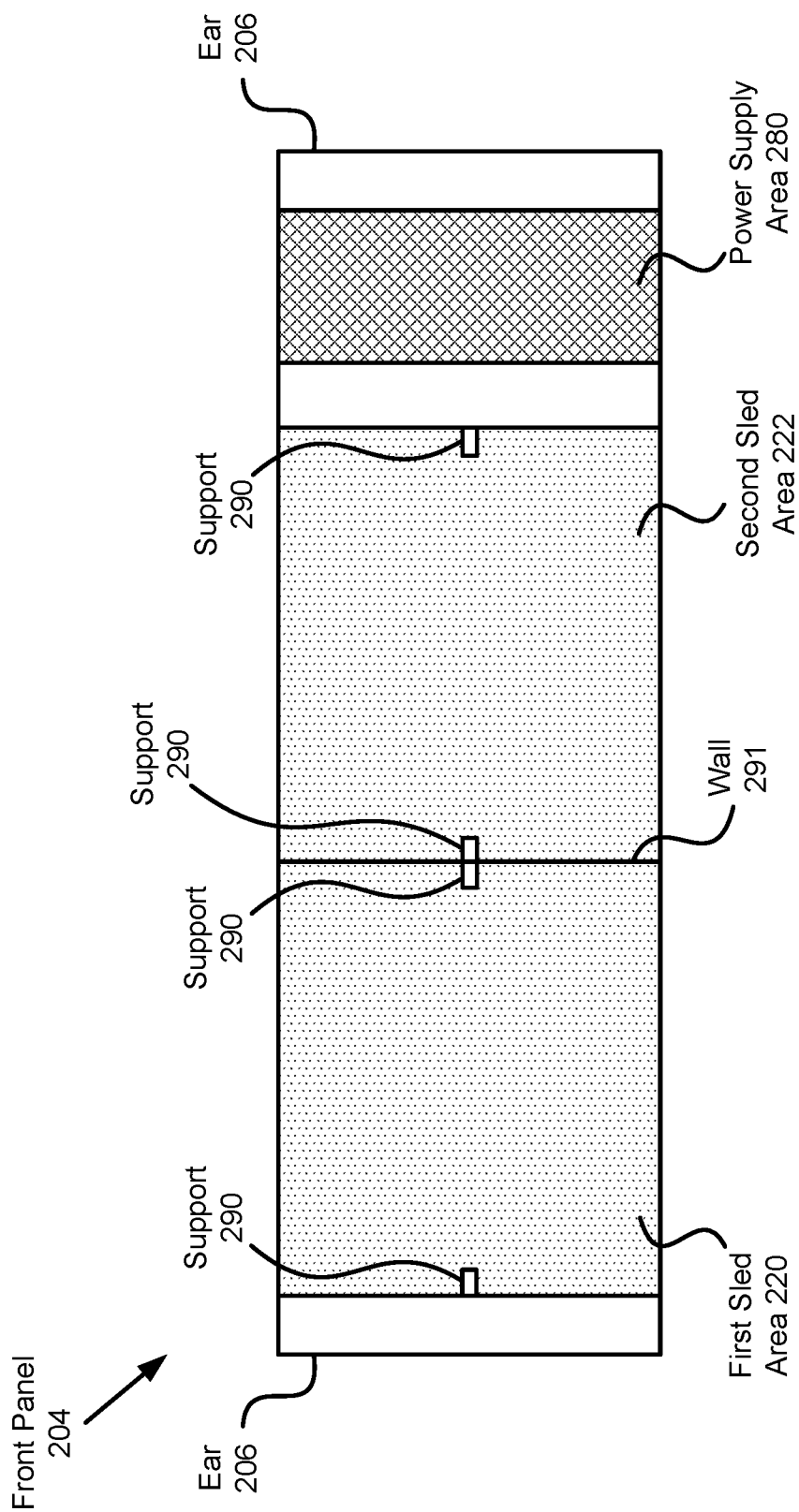
FIGS. 2N-2P show front view diagrams of a chassis in accordance with an embodiment.
Figure 2O:
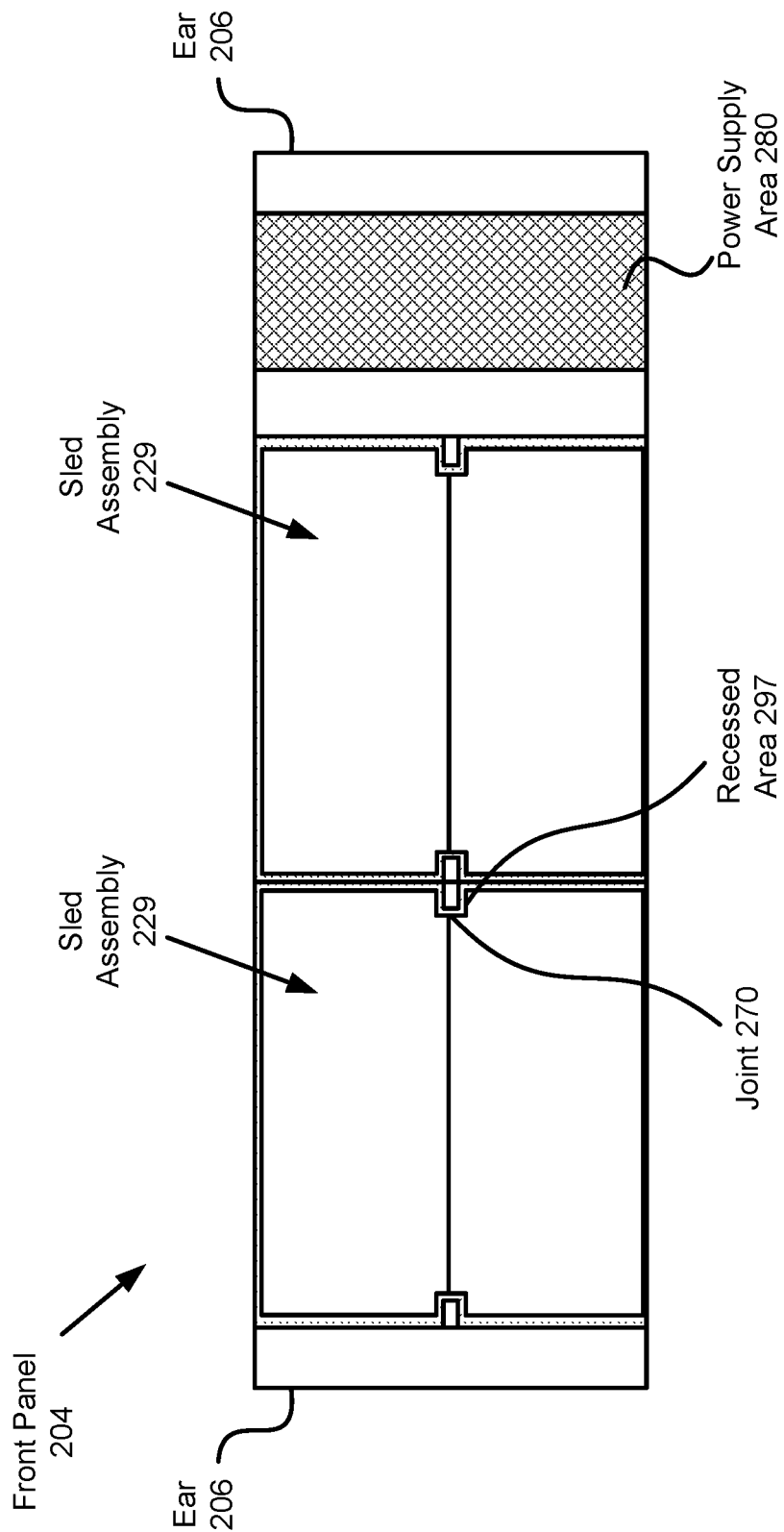
Figure 2P:
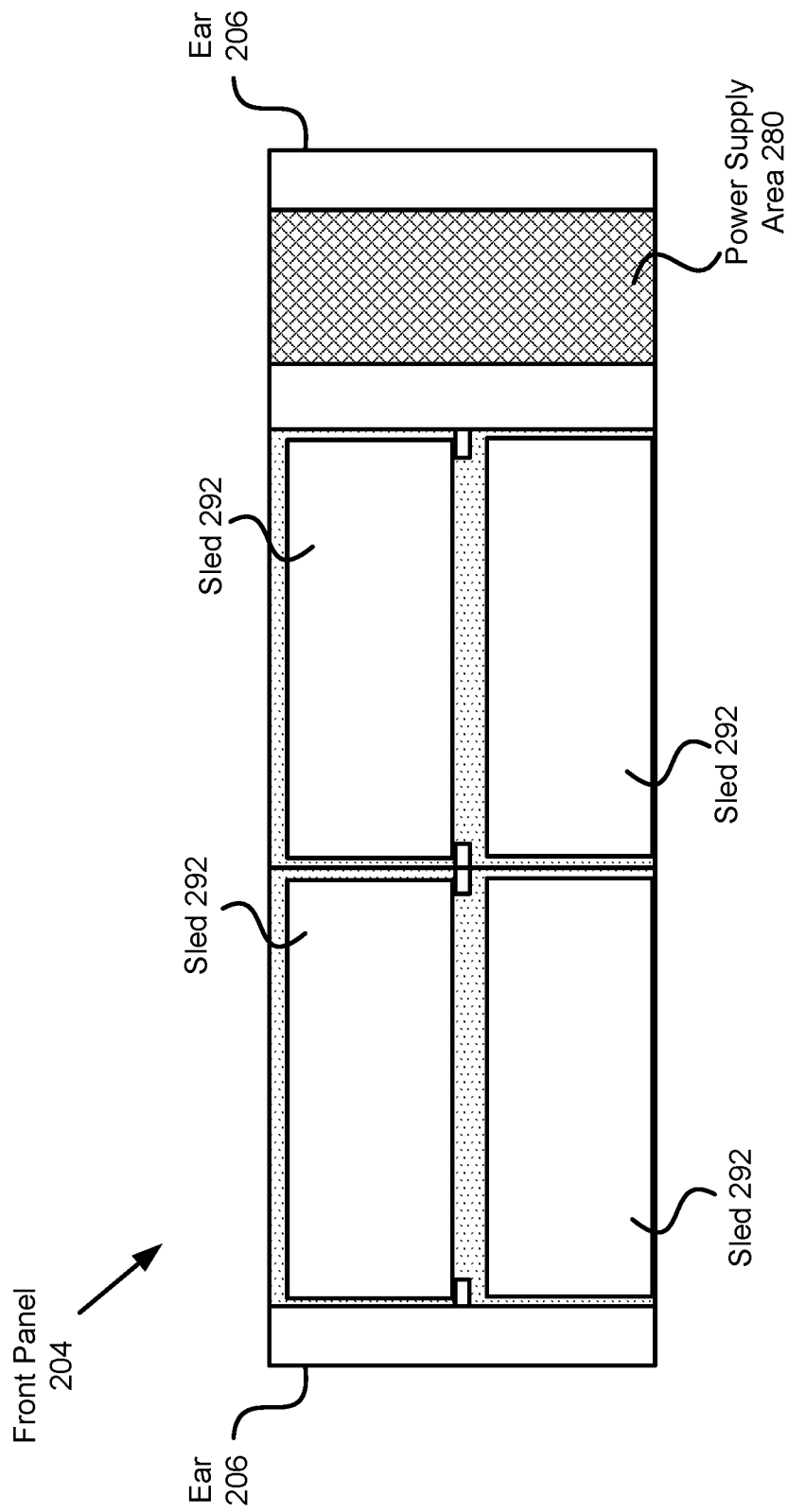

Turning to FIG. 2N, a front view diagram of a chassis in accordance with an embodiment is shown. As seen in FIG. 2N, the chassis may include supports (e.g., 290) that may be used to support certain types of chassis. For example, the supports may be attached on walls (e.g., 291) delimiting first sled area 220 and second sled area 222. The supports may be used to position and support a 1U sled positioned above another 1U sled in the chassis that are not formed as a sled assembly. Refer to FIG. 2P for additional details regarding positioning of two 1U sleds in each of the sled areas (e.g., 220, 222).

To accommodate the supports, a sled assembly may include features such as recessed portions. Turning to FIG. 2O, a front view diagram of a chassis with two sled assemblies positioned inside the chassis in accordance with an embodiment is shown. As seen in FIG. 2O, the sled assemblies (e.g., 229) may include recessed areas (e.g., 297, as part of and/or proximate to the joints (e.g., 270) between the sleds forming the sled assemblies) that allow for each of sled assembly 229 to rest on a bottom of each of the sled areas without generating mechanical interferences with the supports.

Turning to FIG. 2P, a front view diagram of a chassis with four sleds (e.g., 292, 1U sleds) positioned inside the chassis in accordance with an embodiment is shown. As seen in FIG. 2P, two sleds may be positioned in each area. In each sled area, one of the sleds may positioned on the supports in the sled area and the other sled may be positioned on a bottom of the sled area.

Sled 292 may be a single rack unit height sled whereas sled assembly 229 may be a two rack unit height assembly (e.g., including two single rack unit height sleds). Sled 292 may be formed using a lower sled. For example, a cover may be added to lower sled 230 as shown in FIG. 2E to obtain sled 292. Thus, lower sled 292 may be capable of operating independently of upper sled 250.

Figure 2Q:
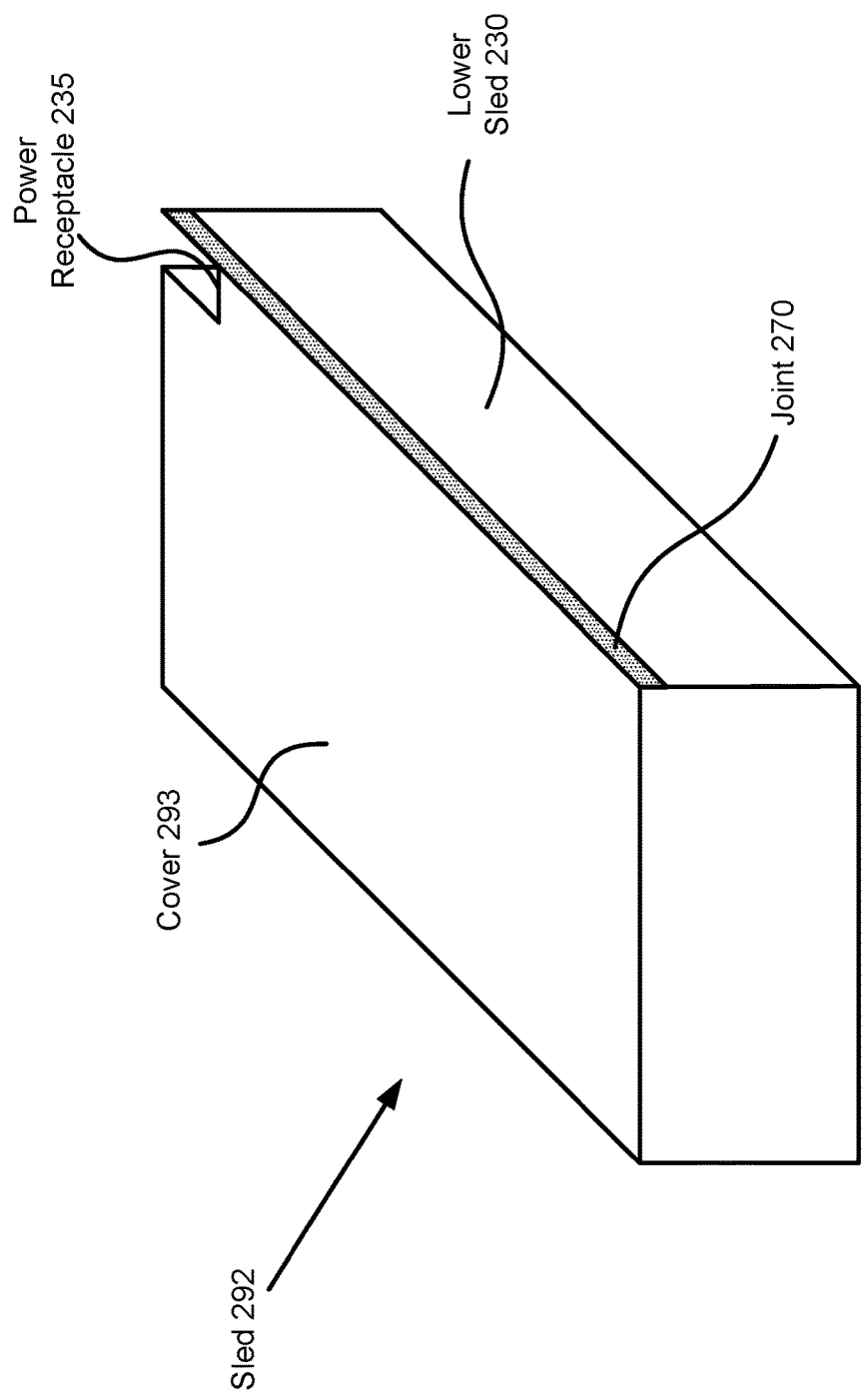
FIG. 2Q shows a diagram of an independent sled in accordance with an embodiment.

Turning to FIG. 2Q, a diagram of sled 292 in accordance with an embodiment is shown. As seen in FIG. 2Q, sled 292 may be obtained by closing lower sled 230 using cover 293. Cover 293 may include features similar to those of upper sled 250 that allow for formation of joint 270 to be formed.

Thus, as seen in FIGS. 2N-2Q, the disclosed embodiments may provide a flexible system for forming data processing systems. For example, a chassis may house (i) two sled assemblies formed using two lower sleds and two upper sleds, (ii) four sleds (e.g., 292) formed with four lower sleds and four covers, and/or (iii) various combinations of sled assemblies and sleds (e.g., one sled assembly in a first sled area and two sled assemblies positioned in the other sled area).

The above approach may provide for a streamlined and efficient assembly process where both single and dual rack unit height sleds may be formed using similar parts (e.g., both may include lower sleds). Thus, the total number of unique parts used to assemble sleds may be reduced.

Figure 3:
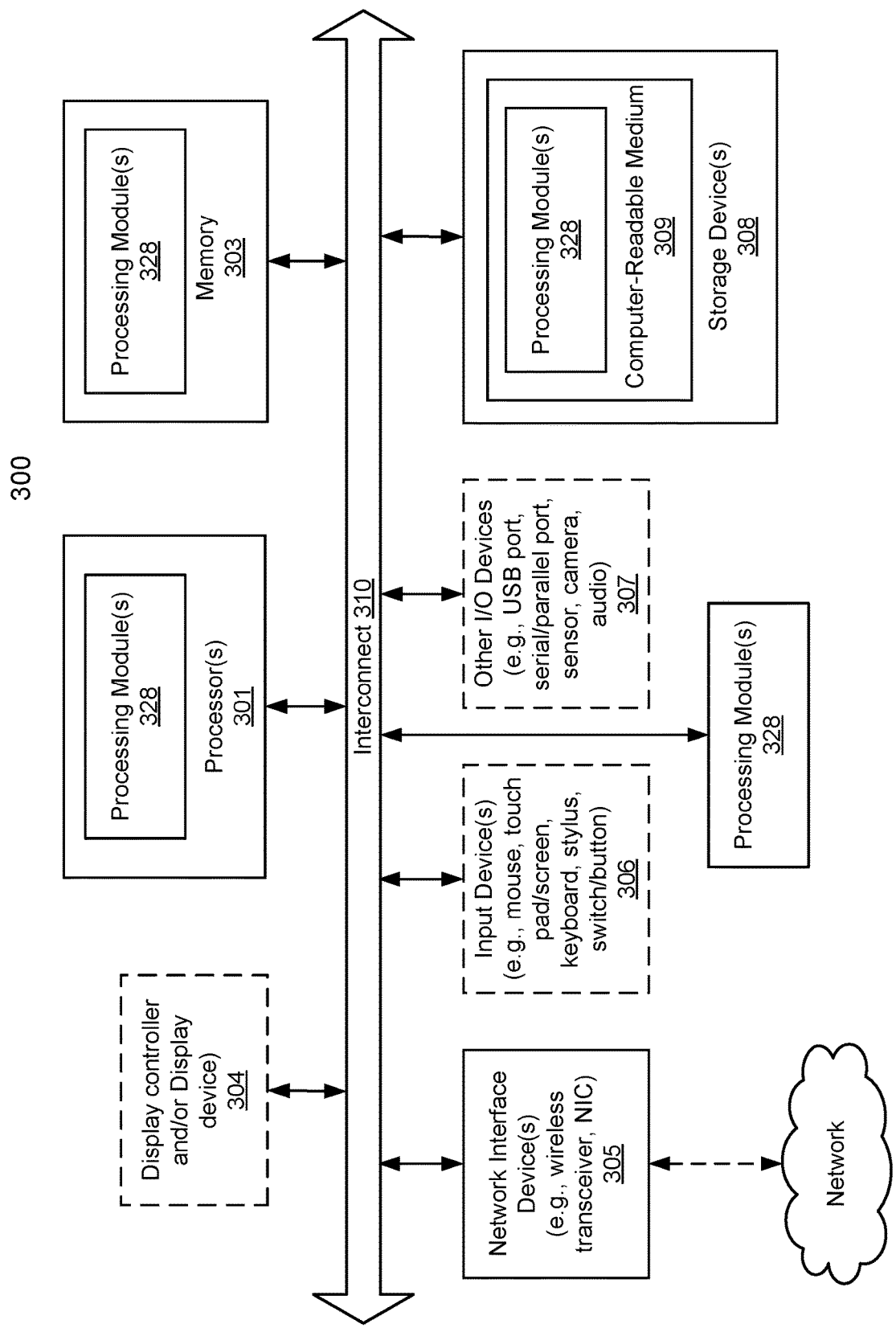
FIG. 3 shows a block diagram illustrating a computing device in accordance with an embodiment.

As discussed with respect to FIG. 1, data processing system 100 may be implemented with computing devices. Turning to FIG. 3, a block diagram illustrating an example of a computing device in accordance with an embodiment is shown. For example, system 300 may represent any of the data processing systems and/or computing devices described above performing any of the processes or methods described above. System 300 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 300 is intended to show a high-level view of many components of the computer system. However, it is to be understood that additional components may be present in certain implementations and furthermore, different arrangement of the components shown may occur in other implementations. System 300 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 300 includes processor 301, memory 303, and devices 305-330 via a bus or an interconnect 310. Processor 301 may represent a single processor or multiple processors with a single processor core or multiple processor cores included therein. Processor 301 may represent one or more general-purpose processors such as a microprocessor, a central processing unit (CPU), or the like. More particularly, processor 301 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 301 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 301, which may be a low power multi-core processor socket such as an ultra-low voltage processor, may act as a main processing unit and central hub for communication with the various components of the system. Such processor can be implemented as a system on chip (SoC). Processor 301 is configured to execute instructions for performing the operations discussed herein. System 300 may further include a graphics interface that communicates with optional graphics subsystem 304, which may include a display controller, a graphics processor, and/or a display device.

Processor 301 may communicate with memory 303, which in one embodiment can be implemented via multiple memory devices to provide for a given amount of system memory. Memory 303 may include one or more volatile storage (or memory) devices such as random access memory (RAM), dynamic RAM (DRAM), synchronous DRAM (SDRAM), static RAM (SRAM), or other types of storage devices. Memory 303 may store information including sequences of instructions that are executed by processor 301, or any other device. For example, executable code and/or data of a variety of operating systems, device drivers, firmware (e.g., input output basic system or BIOS), and/or applications can be loaded in memory 303 and executed by processor 301. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 300 may further include IO devices such as devices (e.g., 305, 306, 307, 308) including network interface device(s) 305, optional input device(s) 306, and other optional IO device(s) 307. Network interface device(s) 305 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 306 may include a mouse, a touch pad, a touch sensitive screen (which may be integrated with a display device of optional graphics subsystem 304), a pointer device such as a stylus, and/or a keyboard (e.g., physical keyboard or a virtual keyboard displayed as part of a touch sensitive screen). For example, input device(s) 306 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 307 may include an audio device. An audio device may include a speaker and/or a microphone to facilitate voice-enabled functions, such as voice recognition, voice replication, digital recording, and/or telephony functions. Other IO devices 307 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 307 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 310 via a sensor hub (not shown), while other devices such as a keyboard or thermal sensor may be controlled by an embedded controller (not shown), dependent upon the specific configuration or design of system 300.

To provide for persistent storage of information such as data, applications, one or more operating systems and so forth, a mass storage (not shown) may also couple to processor 301. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 301, e.g., via a serial peripheral interface (SPI). This flash device may provide for non-volatile storage of system software, including a basic input/output software (BIOS) as well as other firmware of the system.

Storage device 308 may include computer-readable storage medium 309 (also known as a machine-readable storage medium or a computer-readable medium) on which is stored one or more sets of instructions or software (e.g., processing module, unit, and/or processing module/unit/logic 328) embodying any one or more of the methodologies or functions described herein. Processing module/unit/logic 328 may represent any of the components described above. Processing module/unit/logic 328 may also reside, completely or at least partially, within memory 303 and/or within processor 301 during execution thereof by system 300, memory 303 and processor 301 also constituting machine-accessible storage media. Processing module/unit/logic 328 may further be transmitted or received over a network via network interface device(s) 305.

Computer-readable storage medium 309 may also be used to store some software functionalities described above persistently. While computer-readable storage medium 309 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 328, components and other features described herein can be implemented as discrete hardware components or integrated in the functionality of hardware components such as ASICS, FPGAs, DSPs or similar devices. In addition, processing module/unit/logic 328 can be implemented as firmware or functional circuitry within hardware devices. Further, processing module/unit/logic 328 can be implemented in any combination hardware devices and software components.

Note that while system 300 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data processing system that provides computer implemented services, comprising: a chassis; a sled assembly adapted to be positioned in the chassis, the sled assembly comprising: a first sled comprising: a first enclosure comprising: a first horizontal bottom wall, at least two first side walls that extend upward from the first horizontal bottom wall of the first enclosure, and an open top positioned between the at least two first side walls, a compute complex and a first set of hardware components positioned in the first enclosure, and a mating edge positioned at a top-most edge of at least one of the at least two first side walls of the first enclosure, the top-most edge being away from the first horizontal bottom wall; and a second sled comprising: a second enclosure comprising: a horizontal top wall, a second horizontal bottom wall, and at least two second side walls that connect the horizontal top wall of the second enclosure to the second horizontal bottom wall of the second enclosure, an expansion system and a second set of hardware components positioned in the second enclosure, the second set of hardware components being separate from the first set of hardware components positioned in the first sled and being managed solely by the compute complex of the first sled through connection of the second set of hardware components to the compute complex through the expansion system, and the expansion system being a circuit card that is configured for facilitating the connection of the second set of hardware components to the compute complex without means for the expansion system to directly manage the second set of hardware components without the compute complex, a mating wing that extends outward from a bottom-most edge of at least one of the at least two second side walls of the second enclosure, the mating wing having at least one engagement element adapted to engage with one or more portions of the mating edge to reversibly secure the second sled to the first sled, and a hole in the second horizontal bottom wall of the second enclosure, the hole positioned to facilitate operable connection of the compute complex and the expansion system through the open top using cabling while the mating edge and the mating wing are in a mated state.

2. The data processing system of claim 1, wherein the second sled further comprises:
   a storage component positioned in the second enclosure, the storage component being operably connected to the expansion system, and, while the expansion system is operably connected to the compute complex via the cabling, the storage component is operably connected to the compute complex.

3. The data processing system of claim 2, further comprising:
   a power distribution system adapted to deliver power to the first sled and the second sled.

4. The data processing system of claim 3, wherein the expansion system comprises:
   a first port to receive the power from the power distribution system; and
   a second portion to distribute a portion of the power to the storage component.

5. The data processing system of claim 4, wherein the compute complex comprises:
   a third port to receive the power from the power distribution system.

6. The data processing system of claim 3, wherein positioning the sled assembly in the chassis comprises:
   while the second sled is positioned above the first sled and a front of the first sled is offset from a front of the second sled, an approach of the second sled downward toward the first sled until the mating wing is aligned with the mating edge; and
   while the mating wing is aligned with the mating edge, a translation of the second sled along a top of the first sled until offset is reduced below a threshold to secure the first sled to the second sled.

7. The data processing system of claim 6, wherein positioning the sled assembly in the chassis further comprises:
   while the first sled is secured to the second sled, an alignment of a power receptacle of the first sled and a power receptacle of the second sled with a manifold of the power distribution system to obtain an aligned sled assembly; and
   an approach of the aligned sled assembly toward the manifold until the power receptacle of the first sled and the power receptacle of the second sled are mated with the manifold, the manifold providing the power.

8. The data processing system of claim 1, wherein the chassis is a rack mount chassis and the chassis comprises an interior having a height of two rack units.

9. The data processing system of claim 8, wherein the first enclosure and the second enclosure have a combined height when stacked on top of one another of two rack units.

10. The data processing system of claim 9, wherein the interior has a width to accommodate positioning of the first enclosure and the second enclosure in a side by side positioning in the interior.

11. A sled assembly, comprising: a first sled comprising: a first enclosure comprising: a first horizontal bottom wall, at least two first side walls that extend upward from the first horizontal bottom wall of the first enclosure, and an open top positioned between the at least two first side walls, a compute complex and a first set of hardware components positioned in the first enclosure, and a mating edge positioned at a top-most edge of at least one of the at least two first side walls of the first enclosure, the top-most edge being away from the first horizontal bottom wall; and a second sled comprising: a second enclosure comprising: a horizontal top wall, a second horizontal bottom wall, and at least two second side walls that connect the horizontal top wall of the second enclosure to the second horizontal bottom wall of the second enclosure, an expansion system and a second set of hardware components positioned in the second enclosure, the second set of hardware components being separate from the first set of hardware components positioned in the first sled and being managed solely by the compute complex of the first sled through connection of the second set of hardware components to the compute complex through the expansion system, and the expansion system being a circuit card that is configured for facilitating the connection of the second set of hardware components to the compute complex without means for the expansion system to directly manage the second set of hardware components without the compute complex, a mating wing that extends outward from a bottom-most edge of at least one of the at least two second side walls of the second enclosure, the mating wing having at least one engagement element adapted to engage with one or more portions of the mating edge to reversibly secure the second sled to the first sled, and a hole in the second horizontal bottom wall of the second enclosure, the hole positioned to facilitate operable connection of the compute complex and the expansion system through the open top using cabling while the mating edge and the mating wing are in a mated state.

12. The data processing system of claim 1, wherein while the mating edge and the mating wing are in the mated state, the first enclosure is directly secured to the second enclosure.

13. The data processing system of claim 1, wherein while the mating edge and the mating wing are in the mated state, the first enclosure and second enclosure bound four sides of a space in which the compute complex and the expansion system are positioned.

14. The data processing system of claim 13, wherein while the mating edge and the mating wing are in the mated state, the first horizontal bottom wall divides the space.

15. The data processing system of claim 13, wherein the first sled is adapted to mate with a connector of the chassis while the connector is positioned on a fifth side of the space, the connector facilitating power distribution to at least the compute complex.

16. The data processing system of claim 15, wherein the first sled further comprises a power receptacle that is inset into the space from the fifth side of the space, and the power receptacle is adapted to mate with the connectors.

17. The data processing system of claim 15, wherein the chassis comprises:
   a distribution unit for distributing power from a power supply;
   a manifold operably connected to the distribution unit to divide the power into two portions for distribution to the first sled and the second sled; and
   the connector to distribute a first portion of the two portions of power to the first sled.

18. The data processing system of claim 17, wherein the chassis further comprises:
   at least one ear adapted to secure the chassis to a rack.

19. The data processing system of claim 1, wherein an edge of the horizontal bottom wall that delineates the opening circumscribes the cabling, the expansion system comprises ports for physically connecting the expansion to the second set of hardware components position in the second sled and communication chipsets for facilitating communication between the second set of hardware components with the compute complex that solely manages the second set of hardware components, and the at least one engagement element of the mating wing is a pin that is inserted into the one or more portions of the mating edge to secure the mating wing to the mating edge.

20. The data processing system of claim 19, wherein the second sled does not house any compute complexes.

* * * * *